US006960552B2

(12) United States Patent
Otsuka et al.

(10) Patent No.: US 6,960,552 B2
(45) Date of Patent: Nov. 1, 2005

(54) DECOMPOSITIONALLY TREATING AGENT AND DECOMPOSITIONALLY TREATING METHOD FOR FLUOROCARBONS

(75) Inventors: Kenji Otsuka, Kanagawa (JP); Youji Nawa, Kanagawa (JP); Tomohisa Ikeda, Kanagawa (JP); Koshi Ochi, Kanagawa (JP)

(73) Assignee: Japan Pionics Co., Ltd., Tokyo (JP)

(*) Notice: Subject to any disclaimer, the term of this patent is extended or adjusted under 35 U.S.C. 154(b) by 298 days.

(21) Appl. No.: 10/254,665

(22) Filed: Sep. 26, 2002

(65) Prior Publication Data

US 2003/0139639 A1 Jul. 24, 2003

(30) Foreign Application Priority Data

Sep. 28, 2001 (JP) ....................................... 2001-303605
Oct. 4, 2001 (JP) ....................................... 2001-308259

(51) Int. Cl.[7] ........................... B01J 23/00; B01J 23/02; B01J 23/08; B01D 47/00; A62D 3/00

(52) U.S. Cl. ....................... 502/302; 502/303; 502/341; 502/355; 423/210; 423/240 R; 588/206; 588/213; 588/214

(58) Field of Search ................................ 502/302, 303, 502/341, 355; 423/210, 240 R; 588/206, 213, 214

(56) References Cited

U.S. PATENT DOCUMENTS

| | | | | |
|---|---|---|---|---|
| 4,331,565 A | | 5/1982 | Schaefer et al. | 252/462 |
| 6,023,007 A | | 2/2000 | Nakajo et al. | 423/210 |
| 6,069,291 A | | 5/2000 | Rossin et al. | 588/206 |
| 6,162,957 A | | 12/2000 | Nakajo et al. | 588/205 |
| 6,676,913 B2 | * | 1/2004 | Rossin | 423/240 R |
| 2002/0187894 A1 | * | 12/2002 | Domesle et al. | 502/304 |

FOREIGN PATENT DOCUMENTS

| | | |
|---|---|---|
| EP | 0562516 | 9/1993 |
| EP | 0 885 648 | 12/1998 |
| JP | 07 080303 | 3/1995 |

OTHER PUBLICATIONS

European Search Report dated Nov. 27, 2002.
Communication dated Dec. 11, 2002.
European Search Report for EP 02 020715, completed Jan. 24, 2003.

* cited by examiner

*Primary Examiner*—J. A. Lorengo
*Assistant Examiner*—Patricia L. Hailey
(74) *Attorney, Agent, or Firm*—Antonelli, Terry, Stout & Kraus, LLP

(57) ABSTRACT

There are disclosed a decompositionally treating agent for fluorocarbons which comprises an aluminum compound and a lanthanoid compound as effective ingredients; a decompositionally treating agent for fluorocarbons which comprises an aluminum compound, a lanthanoid compound and an alkaline earth metal compound as effective ingredients; and a decompositionally treating method for fluorocarbons which comprises decomposing a fluorocarbon by bringing a fluorocarbon-containing gas into contact under heating with a decompositionally treating agent mentioned above or by bringing the above gas into contact under heating with a decompositionally treating agent comprising aluminum oxide as an effective ingredient and thereafter with a decompositionally treating agent comprising a lanthanoid oxide and an alkaline earth metal oxide. It is made possible by the above agent and method to decompose the fluorocarbons contained in an exhaust gas exhausted from a semiconductor manufacturing industry and the like at a decomposition rate of at least 99.9% at a relatively low decomposition temperature of 1000° C. or lower without deactivating the agent in a short time, or exhausting a corrosive gas such as hydrogen fluoride in the atmosphere.

29 Claims, 4 Drawing Sheets

4 1 7 8 2

(A) (B)

DECOMPOSITIONALLY TREATING AGENT AND DECOMPOSITIONALLY TREATING METHOD FOR FLUOROCARBONS

BACKGROUND OF THE INVENTION

1. Field of the Invention

The present invention relates to a decompositionally treating agent and decompositionally treating method for fluorocarbons. More particularly, it is concerned with a decompositionally treating agent and decompositionally treating method that are capable of decompositionally treating fluorocarbons such as $CF_4$ in high efficiency for a long period of time at a relatively low temperature of 1000° C. or lower, which fluorocarbons are contained in an exhaust gas exhausted from a semiconductor manufacturing process or the like.

2. Description of the Related Arts

In a semiconductor manufacturing industry, there are used fluorocarbons such as $CF_4$, $C_2F_6$, $C_4F_6$ and $C_5F_8$ as an etching gas in a dry etching apparatus or a chamber cleaning gas in a CVD apparatus. Since these fluorocarbons are each a highly stable compound and exert great influence on the global warming, there is caused anxiety about evil influence on the environment when released in the atmosphere. Such being the case, it is preferable to recover or decompose the fluorocarbons contained in an exhaust gas exhausted from a semiconductor manufacturing process or the like, and thereafter release in the atmosphere.

The exhaust gas generated after the conventionally employed fluorocarbons such as $CF_4$, $C_2F_6$, $C_4F_6$ and $C_5F_8$ are used as an etching gas or a chamber cleaning gas frequently contains the above-mentioned fluorocarbons and besides such sour gases as HF, $F_2$ and $SiF_4$, usually in addition to the basis gases including nitrogen, argon and helium. Since the concentration of these fluorocarbons contained in an exhaust gas is usually about 10 to 50000 ppm, which is relatively in a low level, attempts have been made to treat the fluorocarbons mainly by a decomposing method which is inexpensive in running cost.

As a decompositionally treating method for fluorocarbons, there have hitherto been adopted, for instance, a method in which a fluorocarbon-containing exhaust gas is introduced into the flame in a incinerator where hydrogen, methane or propane is used as a fuel to cause fluorocarbon combustion, and a method in which oxygen, air or a mixture of oxygen or air along with moisture is added to a fluorocarbon-containing exhaust gas, and the resultant mixed gas is heated and oxidized. There have also been developed a method in which a fluorine compound such as a fluorocarbon is brought into contact with molecular oxygen in the presence of alumina {refer to Japanese Patent Application Laid-Open No. 286434/1998 (Heisei 10)}, a method in which a fluorine compound is brought into contact with a decompositionally treating catalyst wherein a metal belonging to group 6A, 8 or 3B of the Periodic Table and an inorganic acid such as sulfuric acid, phosphoric acid or boric acid are supported on alumina {refer to Japanese Patent Application Laid-Open No. 165071/1999 (Heisei 11)}, a method in which a fluorine compound is passed through a catalyst bed comprising the mixture of an alumina base catalyst heated to 300 to 1000° C. with a silica-containing mixed member in the coexistence of oxygen and water {refer to Japanese Patent Application Laid-Open No. 15060/2000 (Heisei 12)} and the like methods.

However, the decompositionally treating method by means of combustion suffers from such disadvantages that a combustional state is obliged to be maintained even at standby time when the fluorocarbons are not decompositionally treated, whereby energy cost is markedly increased and besides, a large amount of carbon dioxide gas is released into the atmosphere. The decompositionally treating method by means of heating oxidation with the addition of air or oxygen suffers from such drawbacks that heating to at least 1000° C. is necessary, and a further higher temperature is needed on the decomposition of $CF_4$, whereby the commercialization of a decompositionally treating apparatus is made difficult from the viewpoints of corrosion resistance as well as heat resistance.

The decompositionally treating method for fluorocarbons by means of alumina as the decomposing catalyst is advantageous in its capability of decomposing the same at a relatively low temperature. Nevertheless, the foregoing method suffers from such a shortcoming that the reaction of the fluorocarbon with the alumina forms aluminum fluoride on the surface of the alumina, whereby the decomposing catalyst is deactivated in a short period of time. The decompositionally treating catalyst wherein a metal and an inorganic acid or silica are added to alumina has been developed for the purpose of maintaining the catalytic activity of the catalyst for a relatively long period of time. However, in the case where the fluorocarbon as the treatment object is $CF_4$, it is difficult to decompositionally treat the same continuously for a long time, while maintaining a decomposition rate of around 100% at a temperature of 1000° C. or lower.

In the case of decompositionally treating fluorocarbons in the coexistence of water, it is possible to enhance the decomposition rate. Nevertheless, the foregoing method suffers from such defects that the formation of hydrogen fluoride after the decompositional treatment necessitates the removal of the hydrogen fluoride with a wet cleaning unit or the like prior to releasing the exhaust gas in the atmosphere, and besides that the exhaust gas exhausted from a decompositionally treating unit makes it impossible to use a heat exchanger owing to its high temperature and corrosiveness.

SUMMARY OF THE INVENTION

In such circumstances, an object of the present invention is to provide a decompositionally treating agent and a decompositionally treating method that are capable of decomposing fluorocarbons such as $CF_4$ at a decomposition rate of at least 99.9% at a relatively low temperature of 1000° C. or lower, which fluorocarbons are contained in an exhaust gas exhausted from a semiconductor manufacturing process or the like, without deactivating the decompositionally treating agent in a short time or without exhausting a corrosive gas such as hydrogen fluoride in the atmosphere.

Other objects of the present invention will become obvious from the text of this specification hereinafter disclosed.

As a result of intensive extensive research and development accumulated by the present inventors in order to solve the above-described problems involved in the prior arts, it has been found that the problems can be solved by a decompositionally treating agent which comprises an aluminum compound and a lanthanoid compound as effective ingredients or a decompositionally treating agent which comprises an aluminum compound, a lanthanoid compound and further an alkaline earth metal compound as effective ingredients. Thus, the first aspect of the present invention has been accomplished by the foregoing findings and information.

It has also been found that the problems can be solved by bringing a fluorocarbon into contact under heating with a decompositionally treating agent which comprises aluminum oxide and a lanthanoid oxide as effective ingredients or a decompositionally treating agent which comprises aluminum oxide, a lanthanoid oxide and further an alkaline earth metal oxide as effective ingredients. It has further been found that the problems can be solved by bringing a fluorocarbon into contact under heating with a decompositionally treating agent which comprises aluminum oxide as an effective ingredient, and thereafter bringing the gas into contact with a decompositionally treating agent which comprises a lanthanoid oxide as an effective ingredient, or by bringing a fluorocarbon into contact under heating with a decompositionally treating agent which comprises aluminum oxide as an effective ingredient, and thereafter bringing the gas into contact with a decompositionally treating agent which comprises a lanthanoid oxide as an effective ingredient, and further a decompositionally treating agent which comprises an alkaline earth metal oxide as an effective ingredient. Thus, the second aspect of the present invention has been accomplished by the foregoing findings and information.

That is to say, the present invention relates to a decompositionally treating agent for fluorocarbons which comprises an aluminum compound and a lanthanoid compound as effective ingredients. The present invention also relates to a decompositionally treating agent for fluorocarbons which comprises an aluminum compound, a lanthanoid compound and an alkaline earth metal compound as effective ingredients.

In addition, the present invention is concerned with a decompositionally treating method for fluorocarbons which comprises decomposing a fluorocarbon by bringing a fluorocarbon-containing gas into contact under heating with a decompositionally treating agent which comprises aluminum oxide and a lanthanoid oxide as effective ingredients. Further, the present invention is concerned with a decompositionally treating method for fluorocarbons which comprises decomposing a fluorocarbon by bringing a fluorocarbon-containing gas into contact under heating with a decompositionally treating agent which comprises aluminum oxide, a lanthanoid oxide and an alkaline earth metal oxide as effective ingredients.

The present invention also pertains to a decompositionally treating method for fluorocarbons which comprises decomposing a fluorocarbon by bringing a fluorocarbon-containing gas into contact, under heating in the coexistence of oxygen and/or steam, with a decompositionally treating agent which comprises aluminum oxide as an effective ingredient and thereafter bringing the gas into contact with a decompositionally treating agent which comprises a lanthanoid oxide as an effective ingredient. The present invention further pertains to a decompositionally treating method for fluorocarbons which comprises decomposing a fluorocarbon by bringing a fluorocarbon-containing gas into contact, under heating in the coexistence of oxygen and/or steam, with a decompositionally treating agent which comprises aluminum oxide as an effective ingredient and thereafter bringing the gas into contact with a decompositionally treating agent which comprises a lanthanoid oxide as an effective ingredient and a decompositionally treating agent which comprises an an alkaline earth metal oxide as an effective ingredient.

In addition, the present invention is related to a decompositionally treating method for fluorocarbons which comprises decomposing a fluorocarbon by bringing a fluorocarbon-containing gas into contact under heating in the coexistence of oxygen and/or steam, with a decompositionally treating agent which comprises aluminum oxide as an effective ingredient and thereafter bringing the gas into contact with a decompositionally treating agent which comprises a lanthanoid oxide and an alkaline earth metal oxide as effective ingredients.

DESCRIPTION OF THE PREFERRED EMBODIMENTS

Figure 1:
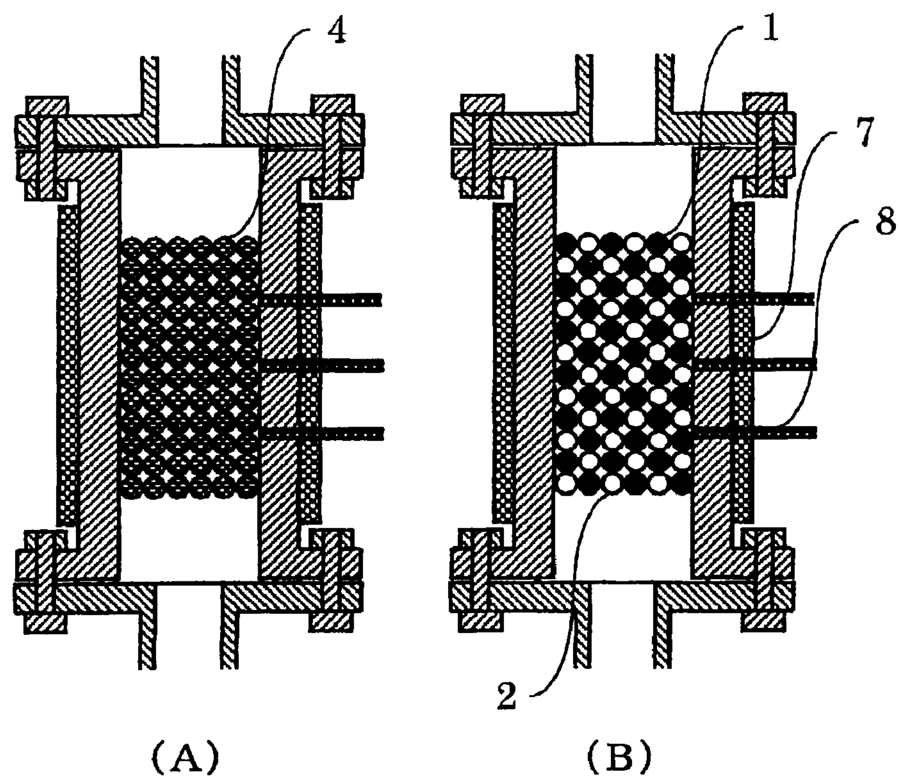
FIG. 1 is a cross sectional view showing an example of decompositionally treating apparatus for the implementation of the decompositionally treating method for fluorocarbons (first embodiment) according to the present invention.

The decompositionally treating agent and decompositionally treating method for fluorocarbons according to the present invention are each applied to the decompositional treatment of a perfluorocarbon in which hydrocarbons are replaced in whole with fluorine and a hydrofluorocarbon in which hydrocarbons are replaced in part with fluorine which are contained in a gas such as nitrogen, argon and helium. In the decompositional treatment of chemically stable $CF_4$ among these fluorocarbons, the above-mentioned agent and method particularly exhibit working effects in terms of the capability of decomposing at a decomposition rate of at least 99.9% at a decomposition temperature of 1000° C. or lower without deactivating the decompositionally treating agent in a short time, or without exhausting a corrosive gas such as hydrogen fluoride in the atmosphere.

In the decompositionally treating agent and decompositionally treating method for fluorocarbons according to the present invention, the fluorocarbons that are each an object of decompositional treatment are exemplified by perfluorocarbons such as $CF_4$, $C_2F_6$, $C_3F_8$, $C_4F_{10}$, $C_5F_{12}$, $C_4F_8$, $C_4F_6$ and $C_5F_8$ and hydrofluorocarbons such as $CH_3F$, $CH_2F_2$, $CHF_3$, $C_2H_4F_2$ and $C_2H_2F_4$.

In the following, detailed description will be given of the decompositionally treating agent for fluorocarbons according to the present invention.

The decompositionally treating agent for fluorocarbons according to the present invention is that which comprises an aluminum compound and a lanthanoid compound as effective ingredients or that which comprises an aluminum compound, a lanthanoid compound and an alkaline earth metal compound as effective ingredients. However, in the case where the aluminum compound, lanthanoid compound and alkaline earth metal compound are each other than an oxide, it is preferable to employ such compounds that are converted into aluminum oxide, a lanthanoid oxide and an alkaline earth metal oxide, respectively by being decomposed at the decomposition temperature of a fluorocarbon in question or a temperature thereabout.

Examples of lanthanoid oxides include lanthanum oxide, cerium oxide, praseodymium oxide, neodymium oxide, promethium oxide, samarium oxide, europium oxide, gadolinium oxide, terbium oxide, dyprosium oxide, holmium oxide, erbium oxide, thulium oxide, yttrium oxide and lutetium oxide.

Examples of the lanthanoid compounds other than the above-mentioned lanthanoid oxides include hydroxides, carbonates, sulfates, nitrates and organic acid salts each of lanthanoid. Of these, hydroxides, carbonates and nitrates are preferable in terms of ease of conversion into oxides, of which hydroxides and carbonates are particularly preferable in terms of non-exhaust of a harmful gas. Examples of the lanthanoid hydroxides include lanthanum hydroxide (including monohydrate), cerium hydroxide (including pentahydrate, octahydrate and nonahydrate), praseodymium hydroxide (including octahydrate), neodymium hydroxide (including octahydrate) and samarium hydroxide. Examples of the lanthanoid carbonates include lanthanum carbonate, cerium carbonate, praseodymium carbonate, neodymium carbonate and samarium carbonate.

Of these lanthanoid compounds, are preferable the compounds of lanthanum, cerium, praseodymium, neodymium, samarium and europium in terms of easy availability. Any of these lanthanoid compounds may be used alone or in combination with at least one other. For instance, "misch metal", which is available on the market as a metal containing two or more lanthanoid compounds, may be used to prepare the decompositionally treating agent for fluorocarbons according to the present invention.

Examples of alkaline earth metal oxides include beryllium oxide, magnesium oxide, calcium oxide, strontium oxide and barium oxide. Of these, magnesium oxide, calcium oxide and strontium oxide are preferable for use, since beryllium oxide has a sublimation starting temperature of 800° C. and barium oxide causes anxiety about toxicity.

Examples of the alkaline earth metal compounds other than the foregoing include hydroxides, carbonates, sulfates, nitrates and organic acid salts each of an alkaline earth metal. Of these, hydroxides, carbonates and nitrates are preferable in terms of ease of conversion into oxides, of which hydroxides and carbonates are particularly preferable for use in terms of non-exhaust of a harmful gas. By the reason same as the foregoing it is preferable to use compounds of magnesium, calcium and strontium, respectively. Any of these alkaline earth metal compounds may be used alone or in combination with at least one other.

Examples of the aluminum compounds to be used in the present invention include aluminum oxide and aluminum hydroxide.

Preferably, the aluminum oxide has pores with an average pore diameter in the range of 50 to 200 Å, of which γ-alumina is preferable. In the case of using the aluminum oxide having pores with an average pore diameter smaller than 50 Å or the aluminum oxide having pores with an average pore diameter larger than 200 Å, there is caused a fear of lowering decomposition rate of fluorocarbons. Preferably also, the aluminum oxide has a specific surface area of at least 100 $m^2/g$. The aluminum oxide has a purity of preferably at least 99% , more preferably at least 99.9%. Preferably, the aluminum hydroxide is in the form of boehmite.

The decompositionally treating agent for fluorocarbons which contains the aluminum compound and lanthanoid compound according to the present invention is prepared usually by mixing the above-mentioned aluminum compound and lanthanoid compound and granulating the resultant mixture, or by granulating the aluminum compound and lanthanoid compound separately, and thereafter mixing the resultant granules.

The decompositionally treating agent for fluorocarbons which contains the aluminum compound, lanthanoid compound and alkaline earth metal compound according to the present invention is prepared usually by mixing the aforesaid aluminum compound, lanthanoid compound and alkaline earth metal compound, and granulating the resultant mixture, or by granulating the aluminum compound, lanthanoid compound and alkaline earth metal compound separately, and thereafter mixing the resultant granules, or by mixing granulated aluminum compound with mixed granules of the lanthanoid compound and alkaline earth metal compound, or by mixing mixed granules of the aluminum compound and one of the other effective ingredients with mixed granules of the remaining effective ingredients.

In any of the above-mentioned methods for preparing the decompositionally treating agent, the ratio of the number of aluminum atoms contained in the agent to the total number of lanthanoid atoms and alkaline earth metal atoms each contained therein is regulated to usually 1:0.1 to 10, preferably 1:0.2 to 5.0. With regard to the number of lanthanoid atoms and the number of alkaline earth metal atoms each contained therein, the decompositional treatment performance (decompositional treatment amount of fluorocarbons per unit amount of the decompositionally treating agent) increases with an increase in the number of lanthanoid atoms, and the ratio of the number of lanthanoid atoms to the number of alkaline earth metal atoms is regulated to usually 1:2 or less, preferably 2:1 or less. In any of the above-mentioned preparation methods, the agent is prepared by granulating into the form of sphere having a diameter of about 0.1 to 20 mm, preferably 1 to 10 mm, or a similar form, or a form and size that are equivalent thereto.

The decompositionally treating agent for fluorocarbons according to the present invention may be incorporated with a binder in addition to the effective ingredients for the purpose of enhancing the moldability and molding strength at the time of granulation. Examples of the binder include organic binders such as polyvinyl alcohol, polyethylene glycol, polypropylene glycol, methyl cellulose and carboxymethyl cellulose, and inorganic binders such as silica, diatomaceous earth, sodium silicate and sodium hydrogensulfate. Any of these binders, when added to the decompositionally treating agent, is added to the effective ingredients at the time of preparing the agent, followed by kneading. The amount of the binder to be added thereto, which varies depending upon the molding conditions and the like, can not be unequivocally specified. The amount thereof, when being unreasonably small, leads to incapability of achieving the working effect as the binder, whereas the amount, when being unreasonably large, results in deterioration of the decompositional treatment performance. In view of the foregoing, the amount is usually 0.1 to 10% by weight, preferably 0.5 to 5% by weight each based on the total weight of the decompositionally treating agent.

The decompositionally treating agent may contain an impurity, an inert substance and the like which do not exert adverse influence on the decomposition of a fluorocarbon. The agent prior to use may contain moisture, but is preferably free from moisture. Thus the moisture therein is regulated usually to at most 2% by weight. Accordingly, the granulation of the effective ingredients is preferably carried out by means of tabletting molding. Even in the case where the agent contains a binder, an impurity, an inert substance, moisture or the like, the content of the effective ingredients is usually at least 70% by weight, preferably at least 90% by weight.

In the following, detailed description will be given of the decompositionally treating method for fluorocarbons according to the present invention with reference to FIG. 1 to FIG. 6, which however shall never limit the present invention thereto.

The first embodiment in the decompositionally treating method for fluorocarbons according to the present invention relates to a method for decomposing fluorocarbons which comprises bringing a fluorocarbon-containing gas under heating into contact with the decompositionally treating agent comprising aluminum oxide and lanthanoid oxide as the effective ingredients. FIG. 1 is a cross sectional view showing an example of decompositionally treating apparatus for the above-mentioned method.

Figure 2:
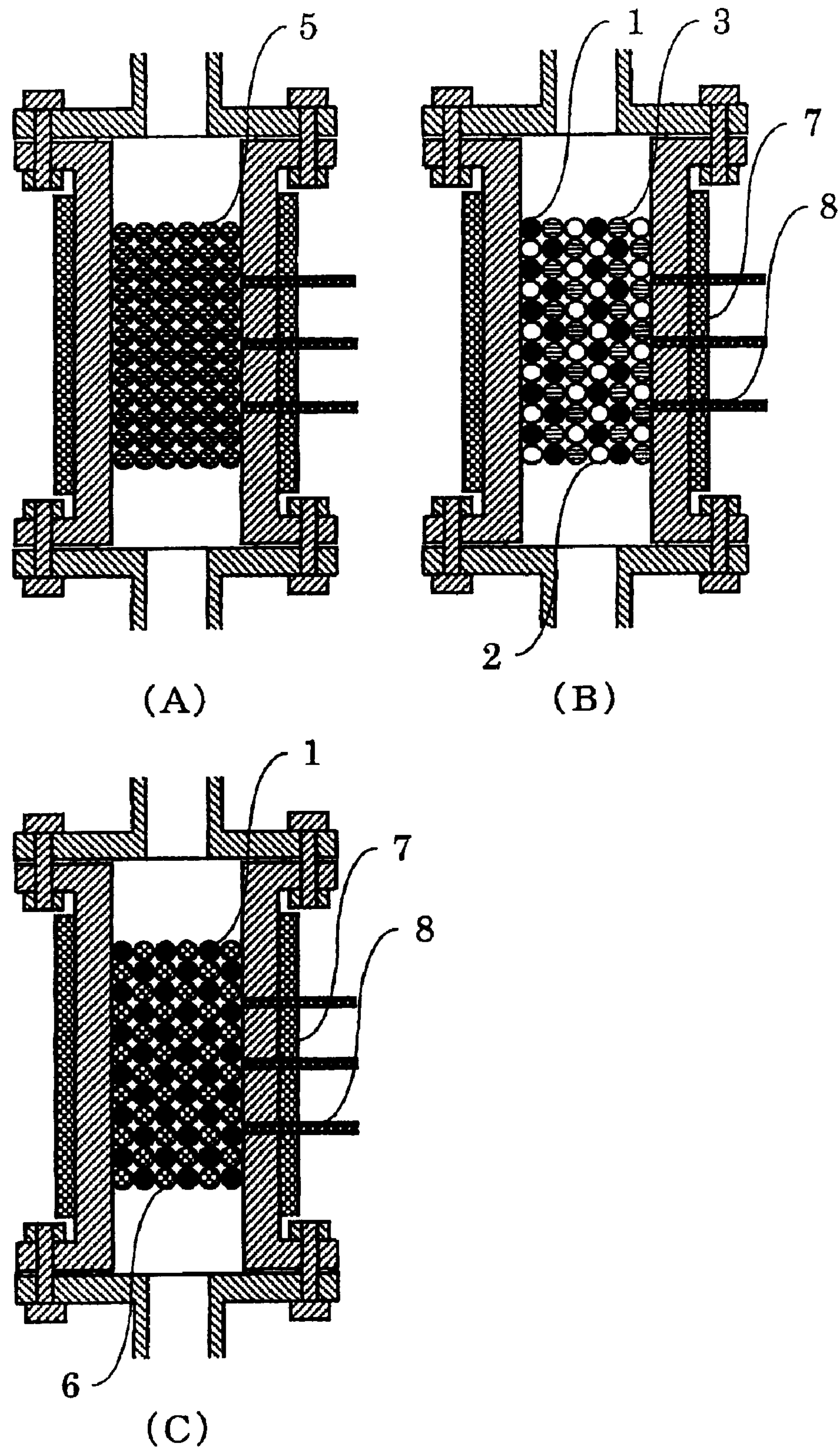
FIG. 2 is a cross sectional view showing an example of decompositionally treating apparatus for the implementation of the decompositionally treating method for fluorocarbons (second embodiment) according to the present invention.

The second embodiment in the decompositionally treating method for fluorocarbons according to the present invention relates to a method for decomposing fluorocarbons which comprises bringing a fluorocarbon-containing gas under heating into contact with the decompositionally treating agent comprising aluminum oxide, a lanthanoid oxide and an alkaline earth metal oxide as the effective ingredients. FIG. 2 is a cross sectional view showing an example of decompositionally treating apparatus for the above-mentioned method.

In the case of decomposing fluorocarbons by the first or the second embodiment, there is usually used the foregoing decompositionally treating agent according to the present invention. In the case of using an aluminum compound, a lanthanoid compound and an alkaline earth metal compound each other than an oxide, it is preferable to adopt such compounds that are each decomposed to be easily converted into an aluminum oxide, a lanthanoid oxide and an alkaline earth metal oxide, respectively at a temperature of decompositional treatment of fluorocarbons or thereabout.

In the case of decomposing fluorocarbons by the first embodiment, the decompositionally treating apparatus is packed inside prior to decompositional treatment, with the decompositionally treating agent composed of a granule 4 which is prepared by mixing an aluminum compound and a lanthanoid compound and granulating the resultant mixture as illustrated on FIG. 1(A), or with the decompositionally treating agent which is prepared by mixing a granulated aluminum compound 1 and a granulated lanthanoid compound 2 as illustrated on FIG. 1(B).

In the case of decomposing fluorocarbons by the second embodiment, the decompositionally treating apparatus is packed inside prior to decompositional treatment, with the decompositionally treating agent composed of a granule 5 which is prepared by mixing an aluminum compound, a lanthanoid compound and an alkaline earth metal compound and granulating the resultant mixture as illustrated on FIG. 2(A), or with the decompositionally treating agent which is prepared by mixing a granulated aluminum compound 1, a granulated lanthanoid compound 2 and a granulated alkaline earth metal compound 3 as illustrated on FIG. 2(B), or with the decompositionally treating agent which is prepared by mixing a granulated aluminum compound 1 and mixed granules 6 of a lanthanoid compound and an alkaline earth metal compound as illustrated on FIG. 2(C).

In the case of decomposing fluorocarbons by the first or the second embodiment, it is possible to use the decompositionally treating agent as a moving bed or a fluidized bed as well as a fixed bed in such a manner as the decompositionally treating apparatus as illustrated on FIGS. 1 and 2. It is made possible to continuously conduct the decompositional treatment for fluorocarbons over a long period of time by such a constitution that, for instance, the decompositionally treating agent which has been deactivated is discharged at an agent discharge port placed on the lower part of the apparatus and at the same time, fresh decompositionally treating agent is supplied into the reaction system through an agent feed port placed on the upper part of the apparatus.

Figure 3:
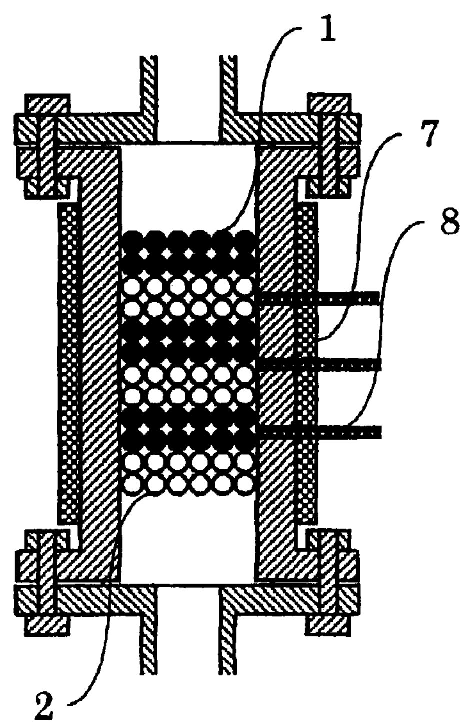
FIG. 3 is a cross sectional view showing an example of decompositionally treating apparatus for the implementation of the decompositionally treating method for fluorocarbons (third embodiment) according to the present invention.

The third embodiment in the decompositionally treating method for fluorocarbons according to the present invention relates to a method for decomposing fluorocarbons which comprises bringing a fluorocarbon-containing gas under heating in the coexistence of oxygen and/or steam into contact with the decompositionally treating agent comprising aluminum oxide as the effective ingredient, and thereafter bringing the gas into contact with the decompositionally treating agent comprising a lanthanoid oxide. FIG. 3 is a cross sectional view showing an example of decompositionally treating apparatus for the above-mentioned method.

In the case of decomposing fluorocarbons by the third embodiment, there are usually used a granulated aluminum compound and a granulated lanthanoid compound. For instance, the decompositionally treating apparatus is packed inside prior to decompositional treatment, with an laminate of the decompositionally treating agent composed of the granulated aluminum compound 1 and the decompositionally treating agent composed of the granulated lanthanoid compound 2 as illustrated on FIG. 3. It is possible in the present invention to carry out the decompositional treatment by a single unit layer consisting of two layers of the respective agents or by laminating a plurality of the foregoing unit layers. FIG. 3 illustrates the constitution in which three unit layers are laminated.

Figure 4:
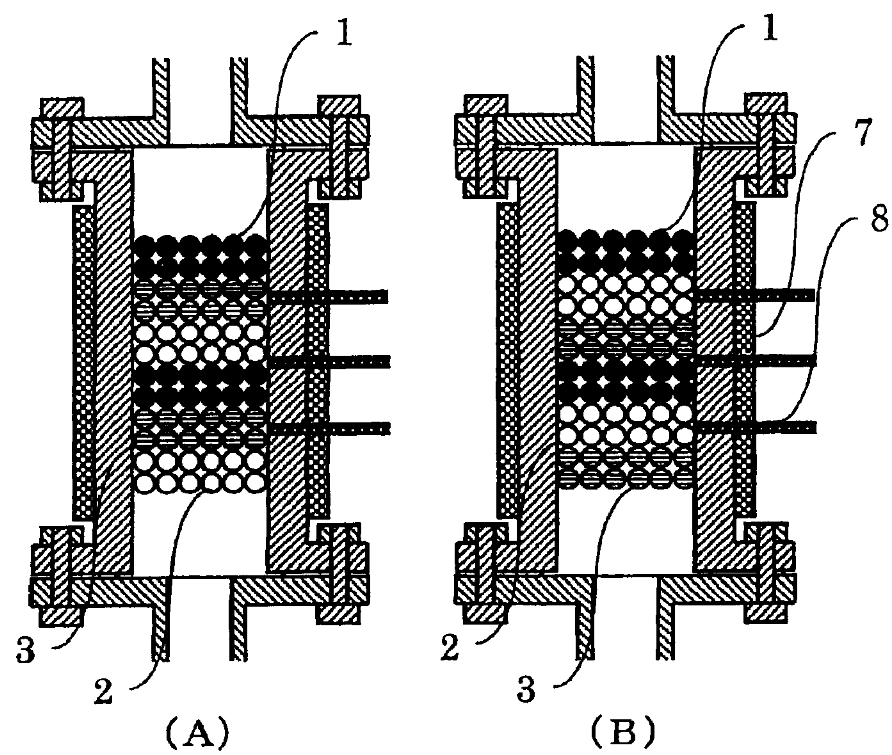
FIG. 4 is a cross sectional view showing an example of decompositionally treating apparatus for the implementation of the decompositionally treating method for fluorocarbons (fourth embodiment) according to the present invention.

The fourth embodiment in the decompositionally treating method for fluorocarbons according to the present invention relates to a method for decomposing fluorocarbons which comprises bringing a fluorocarbon-containing gas under heating in the coexistence of oxygen and/or steam into contact with the decompositionally treating agent comprising aluminum oxide as the effective ingredient, and thereafter bringing it into contact with the decompositionally treating agent comprising a lanthanoid oxide as the effective ingredient and the decompositionally treating agent comprising an alkaline earth metal oxide as the effective ingredient. FIG. 4 is a cross sectional view showing an example of decompositionally treating apparatus for the above-mentioned method. In the present invention, there is no specific limitations on the order of bringing the gas as the object of treatment into contact with the the decompositionally treating agent comprising a lanthanoid oxide as the effective ingredient and the decompositionally treating agent comprising an alkaline earth metal oxide as the effective ingredient.

In the case of decomposing fluorocarbons by the fourth embodiment, there are usually used a granulated aluminum compound, a granulated lanthanoid compound and a granulated alkaline earth metal compound. For instance, the decompositionally treating apparatus is packed inside prior to decompositional treatment, with an laminate of the decompositionally treating agent composed of the granulated aluminum compound 1, the decompositionally treating agent composed of the granulated lanthanoid compound 2 and the decompositionally treating agent composed of the alkaline earth metal compound 3 as illustrated on FIG. 4(A) or 4(B). It is possible in the present invention to carry out the decompositional treatment by a single unit layer consisting of three layers of the respective agents or by laminating a plurality of the foregoing unit layers.

The fifth embodiment in the decompositionally treating method for fluorocarbons according to the present invention relates to a method for decomposing fluorocarbons which comprises bringing a fluorocarbon-containing gas under heating in the coexistence of oxygen and/or steam into contact with the decompositionally treating agent comprising aluminum oxide as the effective ingredient, and thereafter bringing it into contact with the decompositionally treating agent comprising a lanthanoid oxide and an alkaline earth metal oxide as the effective ingredients. FIG. 5(A) and FIG. 5(B) are each a cross sectional view showing an example of decompositionally treating apparatus for the aforesaid method.

In the case of decomposing fluorocarbons by the fifth embodiment, there are usually used a granulated aluminum compound as a source of decompositionally treating agent comprising aluminum oxide as the effective ingredient, and a product produced by mixing and granulating a lanthanoid compound and an alkaline earth metal compound, or a mixture of a granulated lanthanoid compound and a granulated alkaline earth metal compound as a source of decompositionally treating agent comprising a lanthanoid oxide and an alkaline earth metal oxide as the effective ingredients. For instance, the decompositionally treating apparatus is packed inside prior to the decompositional treatment, with a laminate of the decompositionally treating agent composed of the granulated aluminum compound 1 and the decompositionally treating agent composed of mixed granules 6 of the lanthanoid compound and the alkaline earth metal compound as illustrated on FIG. 5(A), or with a laminate of the decompositionally treating agent composed of the granulated aluminum compound 1 and the decompositionally treating agent composed of the granulated lanthanoid compound 2 and the granulated alkaline earth metal compound 3 as illustrated on FIG. 5(B). It is possible in the present invention to carry out the decompositional treatment by a single unit layer consisting of two layers of the respective agents or by laminating a plurality of the foregoing unit layers.

In the third, fourth and fifth embodiments, as is the case with the first and second embodiments, in the case of using an aluminum compound, a lanthanoid compound and an alkaline earth metal compound each other than an oxide, it is preferable to employ such compounds that are each decomposed to be easily converted into an aluminum oxide, a lanthanoid oxide and an alkaline earth metal oxide, respectively at a temperature of decompositional treatment of fluorocarbons or thereabout. The above-mentioned aluminum compound, lanthanoid compound and alkaline earth metal compound are same as the aluminum compound, lanthanoid compound and alkaline earth metal compound, respectively in the foregoing decompositionally treating agent according to the present invention. In addition, the size, shape, preparation method, contents of effective ingredients and impurities each of the granules are the same as those in the foregoing decompositionally treating agent according to the present invention.

The decompositionally treating apparatus to be used in the present invention is usually in a cylindrical form, and has an inside diameter of usually 10 to 500 mm, a length of 20 to 2000 mm, approximately and a packing length of the decompositionally treating agent to be packed therein being usually 10 to 1000 mm, approximately, preferably 50 to 500 mm, approximately. The packing length, when being 10 mm or less, gives rise to insufficient decomposition of fluorocarbons, whereas the length, when being 1000 mm or more, brings about an unreasonably high pressure loss. The thickness of each of the layers of the agents is usually 2 to 200 mm. A heater 7 is usually installed on the outside of the apparatus as illustrated on FIGS. 1 to 5 as a means for heating the apparatus, and the temperature therein is controlled with external control equipment including temperature sensor 8.

In the decompositional treatment of fluorocarbons by the first or second embodiment according to the present invention, an oxygen-containing gas such as air, water, steam or a mixture thereof may be added to a fluorocarbon when being $CF_4$ in conducting the decompositional treatment, but it is possible to decompose the fluorocarbon even when it is not added thereto without exhausting CO. Addition of nothing or of water and/or steam only in the treatment also enables decomposition of a fluorocarbon when being other than $CF_4$, but causes a fear of exhausting CO. Hence it is preferable to add an oxygen-containing gas, water, steam or a mixture thereof in conducting decompositional treatment.

On the other hand, in the decompositional treatment of fluorocarbons by the third, fourth or fifth embodiment according to the present invention, prior to the decompositional treatment, an oxygen-containing gas, water, steam or a mixture thereof is added to a fluorocarbon-containing gas.

In the case of decompositionally treating $CF_4$ according to the present invention by the use of the decompositionally treating agent composed of aluminum oxide, lanthanoid oxide and calcium oxide in the nonexistence of oxygen or steam, it is presumed that reactions take place according to the following formulae 1 to 3. In the case of decompositionally treating a fluorocarbon other than $CF_4$, for instance, $C_2F_6$ by using the decompositionally treating agent composed of aluminum oxide, lanthanoid oxide and calcium oxide in the coexistence of oxygen, it is presumed that reactions take place according to the following formulae 4 to 6. In the case of decompositionally treating $C_2F_6$ by using the decompositionally treating agent composed of aluminum oxide, lanthanoid oxide and calcium oxide in the coexistence of steam, it is presumed that reactions take place according to the following formulae 7 to 12.

$$2Al_2O_3+3CF_4 \rightarrow 4AlF_3+3CO_2 \quad \text{(Formula 1)}$$

$$2AlF_3+La_2O_3 \rightarrow Al_2O_3+2LaF_3 \quad \text{(Formula 2)}$$

$$2AlF_3+3CaO \rightarrow Al_2O_3+2CaF_2 \quad \text{(Formula 3)}$$

$$2Al_2O_3+2C_2F_6+O_2 \rightarrow 4AlF_3+4CO_2 \quad \text{(Formula 4)}$$

$$2AlF_3+La_2O_3 \rightarrow Al_2O_3+2LaF_3 \quad \text{(Formula 5)}$$

$$2AlF_3+3CaO \rightarrow Al_2O_3+3CaF_2 \quad \text{(Formula 6)}$$

$$Al_2O_3+C_2F_6 \rightarrow 2AlF_3+CO+CO_2 \quad \text{(Formula 7)}$$

$$2AlF_3+La_2O_3 \rightarrow Al_2O_3+2LaF_3 \quad \text{(Formula 8)}$$

$$2AlF_3+3CaO \rightarrow Al_2O_3+3CaF_2 \quad \text{(Formula 9)}$$

$$2AlF_3+3H_2O \rightarrow Al_2O_3+6HF \quad \text{(Formula 10)}$$

$$6HF+La_2O_3 \rightarrow 2LaF_3+3H_2O \quad \text{(Formula 11)}$$

$$2HF+CaO \rightarrow CaF_2+H_2O \quad \text{(Formula 12)}$$

That is to say, in the case of decomposing fluorocarbons according to the present invention, aluminum fluoride is formed on the surface of aluminum oxide by the reaction with a fluorocarbon. Thereupon, the resultant aluminum fluoride immediately reacts with the lanthanoid oxide and alkaline earth metal oxide to be regenerated into aluminum oxide, thereby enabling to decompositionally treating the fluorocarbon continuously for a long period of time. As is clear from the foregoing chemical formulae, the decompositional treatment performance (decompositional treatment amount of fluorocarbons per unit amount of the decompositionally treating agent) increases with an increase in the content of the lanthanoid compounds rather than the content of the alkaline earth metal compounds.

In the decompositionally treating method according to the present invention, CO exhaust can be prevented in the case where oxygen coexists. In the case of decomposing a fluorocarbon other than $CF_4$ without the coexistence of oxygen, there is caused a fear of exhausting CO, which however, can easily be cleaned by installing a dry cleaning apparatus in a post stage. In the case where steam coexists, it reacts with aluminum fluoride, thus enabling a further long time of decompositional treatment. Hydrogen fluoride as a corrosive gas, which is produced in this case, immediately disappears by reacting with a lanthanoid oxide and/or an alkaline earth metal oxide, thus preventing the corrosive gas from exhausting from the decompositionally treating apparatus. Moreover in the decompositional treatment for fluorocarbons by the third, fourth or fifth embodiment according to the present invention, the coexistence of steam can prevent the deactivation of aluminum oxide in the lower layer which is caused by HF.

The temperature of contact between a fluorocarbon and decompositionally treating agent varies depending upon the type, concentration, flow rate and the like of fluorocarbons, and thus can not be unequivocally defined. In the case of decompositionally treating a fluorocarbon other than $CF_4$, the temperature is usually in the range of 300 to 1000° C., and in the case of decompositionally treating $CF_4$, the temperature is usually in the range of 700 to 1000° C. A temperature thereof, when being lower than the above-mentioned lower limit, brings about a low decomposition rate of the fluorocarbon, whereas the temperature thereof, when being higher than 1000° C., causes such a disadvantage that highly heat resistant materials are required of the decompositionally treating apparatus. The decompositional treatment is conducted usually under atmospheric pressure, but can also be carried out under reduced pressure such as 1 KPa or under pressure such as 0.2 MPa (absolute pressure).

There is no specific limitation on the flow velocity of the fluorocarbon-containing gas in the treatment apparatus of the present invention, but preferably, the flow velocity thereof decreases with an increase in the concentration of the fluorocarbon contained in the gas. Therefore, the decompositionally treating apparatus is designed in accordance with the type, concentration and the like of fluorocarbons, and the superficial linear velocity (LV) of at most 50 cm/sec.

Figure 6:
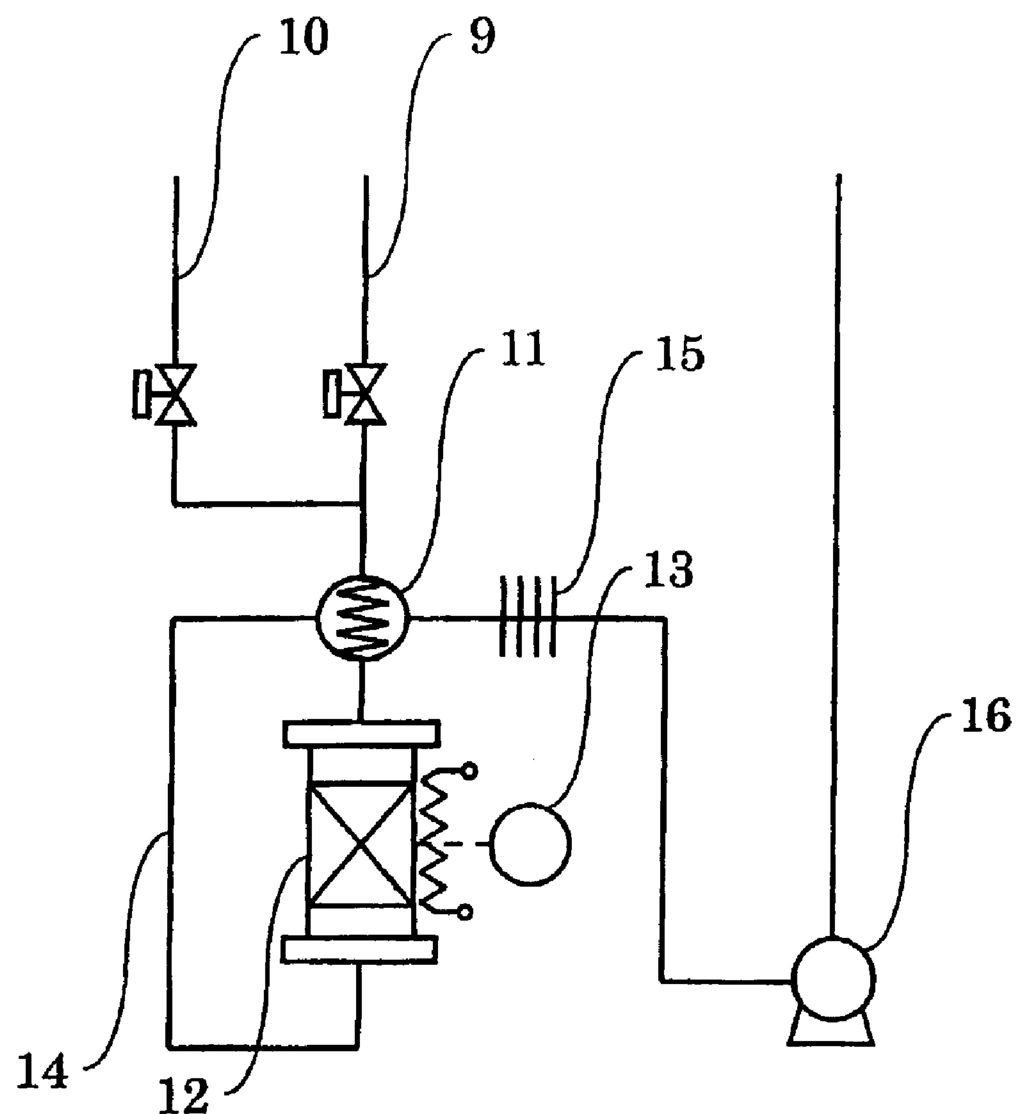
FIG. 6 is a constitutional view showing an example of decompositionally treating system for the implementation of the decompositionally treating method for fluorocarbons according to the present invention.

FIG. 6 is a constitutional view showing an example of decompositionally treating system for the implementation of the decompositionally treating method for fluorocarbons. In FIG. 6 illustrating the decompositionally treating system for fluorocarbons, a fluorocarbon-containing gas, oxygen and/or steam are each introduced, through the introduction line for fluorocarbon 9 and the introduction line for oxygen and/or steam 10, respectively, into the decompositionally treating apparatus for fluorocarbon 12, where the fluorocarbon is decomposed, and the decomposed products are exhausted through the exhaust line for decomposed gas 14. In the case of decompositionally treating the fluorocarbon by the first or the second embodiment according to the present invention, it is possible to carry out the decompositional treatment without the use of the introduction line for oxygen and/or steam 10.

In the present invention as illustrated on FIG. 6, it is possible that a fluorocarbon-containing gas prior to the decompositional treatment and the gas after the decompositional treatment are able to be subjected to heat exchange with each other by means of a heat exchanger 11 since a corrosive gas is not exhausted. Moreover, the present invention dispenses with equipment for cleaning corrosive gas such as hydrogen fluoride. In FIG. 6, the symbols 13, 15 and 16 are temperature controller, cooler and blower, respectively.

In summarizing the working effects and advantages of the present invention, it has been made possible by the decompositionally treating agent and the decompositionally treating method to decompose fluorocarbons such as $CF_4$ contained in an exhaust gas exhausted from a semiconductor manufacturing process and the like at a decomposition rate of at least 99.9% at a relatively low decomposition temperature of 1000° C. or lower without deactivating the decompositionally treating agent in a short time, or without exhausting a corrosive gas such as hydrogen fluoride in the atmosphere. In addition, since the decomposed gas exhausted from the decompositionally treating apparatus is free from a corrosive gas such as hydrogen fluoride, equipment for cleaning corrosive gas is dispensed with and besides, it has been made possible to subject a fluorocarbon-containing gas prior to the decompositional treatment and the gas after the decompositional treatment to heat exchange with each other by means of a heat exchanger, thereby enabling to suppress the loss of thermal energy.

In what follows, the present invention will be described in more detail with reference to comparative examples and working examples, which however shall never limit the present invention thereto.

EXAMPLE 1

<<Preparation of Decompositionally Treating Agent>>

An alumina catalyst available on a market (average pore diameter of 130 Å, purity of 99.9%) and lanthanum oxide (purity of 99%) were each pulverized to 100 micron or smaller, and mixed with each other so as to achieve an atomic ratio (Al/La) of 0.5. The resultant mixture was packed in a mold measuring 20 mm in inside diameter and 5 mm in height. Thereafter the packed mixture was compressed at a pressure of 150 to 160 kg/cm$^2$ for 30 seconds by the use of a hydraulic jack into a molded product, which was ground and sieved. Thus, particles passing through an aperture of 3.36 mm and not passing through an aperture of 2.00 mm were selected for use as a decompositionally treating agent.

<<Decompositional Treatment Test>>

The above-mentioned decompositionally treating agent was packed in the inside of a decompositionally treating apparatus which was made of SUS 316L, and had an inside diameter of 42 mm and a length of 1000 mm in such a constitution as illustrated on FIG. 1(A) and having a packing length of 300 mm. The agent in the apparatus was heated to 860° C. and thereafter, gaseous nitrogen containing $CF_4$ at a flow rate of 10 milliliter (mL)/min, making a total flow rate of 877 mL/min, steam at a flow rate of 73 mL/min and oxygen at a flow rate of 50 mL/min were introduced into the apparatus to decompose the $CF_4$.

During the operation, part of the decomposed gas exhausted through the exhaust port of the apparatus was collected, and analyzed for $CF_4$ at every 30 minutes interval by means of FT-IR(Fourier transform infrared spectrophotometer) and GC-TCD (thermal conductivity detector). Thus, a measurement was made of the period of time until the the decomposition rate of $CF_4$ came to be less than 99.9% to determine the decompositional treatment amount of $CF_4$ (L) (decompositional treatment performance) per one liter of the decompositionally treating agent and at the same time, to examine the existence of HF in the exhaust gas by the use of a detector (manufactured by GasTec Co., Ltd.). The results are given in Table 1.

EXAMPLES 2, 3

The procedure in Example 1 was repeated to prepare the decompositionally treating agents and carry out the decompositional treatment tests for $CF_4$ by the use of the agents thus prepared except that in preparing the agent according to Example 1, the atomic ratios of aluminum to lanthanum (Al/La) were altered into 0.25 and 1.0, respectively. The results are given in Table 1.

EXAMPLES 4, 5

The procedure in Example 1 was repeated to prepare the decompositionally treating agents and carry out the decompositional treatment tests for $CF_4$ except that the concentrations of $CF_4$ were altered into 0.2 and 2.0%, respectively. The results are given in Table 1.

EXAMPLES 6 TO 8

The procedure in Example 1 was repeated to prepare the decompositionally treating agents and carry out the decompositional treatment tests for fluorocarbons except that $C_2F_6$, $C_3F_8$ and $CHF_3$ were used, respectively as fluorocarbons in place of $CF_4$. The results are given in Table 1.

EXAMPLES 9, 10

The procedure in Example 1 was repeated to prepare the decompositionally treating agents and carry out the decompositional treatment tests for $CF_4$ except that lanthanum oxide in the preparation of the agent was altered into lanthanum hydroxide and lanthanum carbonate, respectively. The results are given in Table 1.

EXAMPLE 11

The decompositionally treating agent which had been prepared in the same manner as in Example 1 was packed in the inside of a decompositionally treating apparatus which was made of SUS 316L, and had an inside diameter of 42 mm and a length of 1000 mm in such a constitution as illustrated on FIG. 1(A) and having a packing length of 300 mm. The agent in the apparatus was heated to 860° C. and thereafter, gaseous nitrogen containing $CF_4$ at a flow rate of 10 milliliter (mL)/min, making a total flow rate of 950 mL/min, and oxygen at a flow rate of 50 mL/min were introduced into the apparatus to decompose the $CF_4$.

During the operation, part of the decomposed gas exhausted through the exhaust port of the apparatus was collected, and analyzed for $CF_4$ at every 30 minutes interval by means of FT-IR(Fourier transform infrared spectrophotometer) and GC-TCD (thermal conductivity detector). Thus, a measurement was made of the period of time until the the decomposition rate of $CF_4$ came to be less than 99.9% to determine the decompositional treatment amount of $CF_4$ (L) (decompositional treatment performance) per one liter of the decompositionally treating agent and at the same time, to examine the existence of HF in the exhaust gas by the use of a detector (manufactured by GasTec Co., Ltd.). The results are given in Table 1.

EXAMPLES 12, 13

The procedure in Example 11 was repeated to prepare the decompositionally treating agents and carry out the decompositional treatment tests for $CF_4$ by the use of the agents thus prepared except that in preparing the agent according to Example 1, the atomic ratios of aluminum to lanthanum (Al/La) were altered into 0.25 and 1.0, respectively. The results are given in Table 1.

EXAMPLES 14, 15

The procedure in Example 11 was repeated to prepare the decompositionally treating agents and carry out the decompositional treatment tests for $CF_4$ except that the concentrations of $CF_4$ were altered into 0.2 and 2.0%, respectively. The results are given in Table 1.

EXAMPLES 16 TO 18

The procedure in Example 11 was repeated to prepare the decompositionally treating agents and carry out the decompositional treatment tests for fluorocarbons except that $C_2F_6$, $C_3F_8$ and $CHF_3$ were used, respectively as fluorocarbons in place of $CF_4$. The results are given in Table 1.

EXAMPLES 19, 20

The procedure in Example 1 was repeated to prepare the decompositionally treating agents except that lanthanum oxide in the preparation of the agent was altered into lanthanum hydroxide and lanthanum carbonate, respectively. Then the decompositional treatment tests for $CF_4$ were carried out by the use of the resultant agents in the same manner as in Example 11. The results are given in Table 1.

EXAMPLE 21

The decompositionally treating agent which had been prepared in the same manner as in Example 1 was packed in the inside of a decompositionally treating apparatus which was made of SUS 316L, and had an inside diameter of 42 mm and a length of 1000 mm in such a constitution as illustrated on FIG. 1(A) and having a packing length of 300 mm. The agent in the apparatus was heated to 860° C. and thereafter, gaseous nitrogen containing $CF_4$ at a flow rate of 10 milliliter (mL)/min, making a total flow rate of 1000 mL/min was introduced into the apparatus to decompose the $CF_4$.

During the operation, part of the decomposed gas exhausted through the exhaust port of the apparatus was collected, and analyzed for $CF_4$ at every 30 minutes interval by means of FT-IR(Fourier transform infrared spectrophotometer) and GC-TCD (thermal conductivity detector). Thus, a measurement was made of the period of time until the the decomposition rate of $CF_4$ came to be less than 99.9% to determine the decompositional treatment amount of $CF_4$ (L) (decompositional treatment performance) per one liter of the decompositionally treating agent and at the same time, to examine the existence of HF in the exhaust gas by the use of a detector (manufactured by GasTec Co., Ltd.). The results are given in Table 1.

EXAMPLES 22, 23

The procedure in Example 21 was repeated to prepare the decompositionally treating agents and carry out the decompositional treatment tests for $CF_4$ by the use of the agents thus prepared except that in preparing the agent according to Example 1, the atomic ratios of aluminum to lanthanum (Al/La) were altered into 0.25 and 1.0, respectively. The results are given in Table 1.

EXAMPLES 24, 25

The procedure in Example 21 was repeated to prepare the decompositionally treating agents and carry out the decompositional treatment tests for $CF_4$ except that the concentrations of $CF_4$ were altered into 0.2 and 2.0%, respectively. The results are given in Table 1.

EXAMPLES 26 TO 28

The procedure in Example 21 was repeated to prepare the decompositionally treating agents and carry out the decompositional treatment tests for fluorocarbons except that $C_2F_6$, $C_3F_8$ and $CHF_3$ were used, respectively as fluorocarbons in place of $CF_4$. The results are given in Table 1.

EXAMPLE 29, 30

The procedure in Example 1 was repeated to prepare the decompositionally treating agents except that lanthanum oxide in the preparation of the agent was altered into lanthanum hydroxide and lanthanum carbonate, respectively. Then the decompositional treatment tests for $CF_4$ were carried out by the use of the resultant agents in the same manner as in Example 21. The results are given in Table 1.

EXAMPLE 31

<<Preparation of Decompositionally Treating Agent>>

An alumina catalyst available on a market (average pore diameter of 130 Å, purity of 99.9%, particle diameter of 2 to 3 mm) was used as granulated aluminum oxide. Lanthanum oxide available on a market (purity of 99%) was pulverized to 100 micron or smaller, packed in a mold measuring 20 mm in inside diameter and 5 mm in height, and thereafter compressed at a pressure of 150 to 160 $kg/cm^2$ for 30 seconds by the use of a hydraulic jack into a molded product, which was ground and sieved. Thus, particles passing through an aperture of 3.36 mm and not passing through an aperture of 2.00 mm were selected for use as granulated lanthanum oxide. The granulated aluminum oxide and the granulated lanthanum oxide were mixed with each other so as to achieve an atomic ratio (Al/La) of 0.5. The resultant mixture was used as the decompositionally treating agent.

<<Decompositional Treatment Test>>

The above-mentioned decompositionally treating agent was packed in the inside of a decompositionally treating apparatus which was made of SUS 316L, and had an inside diameter of 42 mm and a length of 1000 mm in such a constitution as illustrated on FIG. 1(B) and having a packing length of 300 mm. The agent in the apparatus was heated to 860° C. and thereafter, gaseous nitrogen containing $CF_4$ at a flow rate of 10 milliliter (mL)/min, making a total flow rate of 877 mL/min, steam at a flow rate of 73 mL/min and oxygen at a flow rate of 50 mL/min were introduced into the apparatus to decompose the $CF_4$.

During the operation, part of the decomposed gas exhausted through the exhaust port of the apparatus was collected, and analyzed for $CF_4$ at every 30 minutes interval by means of FT-IR(Fourier transform infrared spectrophotometer) and GC-TCD (thermal conductivity detector). Thus, a measurement was made of the period of time until the the decomposition rate of $CF_4$ came to be less than 99.9% to determine the decompositional treatment amount of $CF_4$ (L) (decompositional treatment performance) per one liter of the decompositionally treating agent and at the same time, to examine the existence of HF in the exhaust gas by the use of a detector (manufactured by GasTec Co., Ltd.). The results are given in Table 2.

EXAMPLES 32, 33

The procedure in Example 31 was repeated to prepare the decompositionally treating agents and carry out the decompositional treatment tests for $CF_4$ by the use of the agents thus prepared except that in preparing the agent according to Example 31, the atomic ratios of aluminum to lanthanum (Al/La) were altered into 0.25 and 1.0, respectively. The results are given in Table 2.

EXAMPLES 34, 35

The procedure in Example 31 was repeated to prepare the decompositionally treating agents and carry out the decompositional treatment tests for $CF_4$ except that the concentrations of $CF_4$ were altered into 0.2 and 2.0%, respectively. The results are given in Table 2.

EXAMPLES 36 TO 38

The procedure in Example 31 was repeated to prepare the decompositionally treating agents and carry out the decompositional treatment tests for fluorocarbons except that $C_2F_6$, $C_3F_8$ and $CHF_3$ were used, respectively as fluorocarbons in place of $CF_4$. The results are given in Table 2.

EXAMPLE 39, 40

The procedure in Example 31 was repeated to prepare the decompositionally treating agents except that lanthanum oxide in the preparation of the agent was altered into lanthanum hydroxide and lanthanum carbonate, respectively. Then the decompositional treatment tests for $CF_4$ were carried out by the use of the resultant agents in the same manner as in Example 31. The results are given in Table 2.

EXAMPLE 41

The decompositionally treating agent which had been prepared in the same manner as in Example 31 was packed in the inside of a decompositionally treating apparatus which was made of SUS 316L, and had an inside diameter of 42 mm and a length of 1000 mm in such a constitution as illustrated on FIG. 1(B) and having a packing length of 300 mm. The agent in the apparatus was heated to 860° C. and then, gaseous nitrogen containing $CF_4$ at a flow rate of 10 mL/min, making a total flow rate of 950 mL/min, and oxygen at a flow rate of 50 mL/min were introduced into the apparatus to decompose the $CF_4$.

During the operation, part of the decomposed gas exhausted through the exhaust port of the apparatus was collected, and analyzed for $CF_4$ at every 30 minutes interval by means of FT-IR(Fourier transform infrared spectrophotometer) and GC-TCD (thermal conductivity detector). Thus, a measurement was made of the period of time until the the decomposition rate of $CF_4$ came to be less than 99.9% to determine the decompositional treatment amount of $CF_4$ (L) (decompositional treatment performance) per one liter of the decompositionally treating agent and also to examine the existence of HF in the exhaust gas by the use of a detector (manufactured by GasTec Co., Ltd.). The results are given in Table 2.

EXAMPLES 42, 43

The procedure in Example 31 was repeated to prepare the decompositionally treating agents except that in preparing the agent according to Example 31, the atomic ratios of aluminum to lanthanum (Al/La) were altered into 0.25 and 1.0, respectively. Then, the decompositional treatment tests for $CF_4$ were carried out by the use of the resultant agents in the same manner as in Example 41. The results are given in Table 2.

EXAMPLES 44, 45

The procedure in Example 41 was repeated to prepare the decompositionally treating agents and carry out the decompositional treatment tests for $CF_4$ except that the concentrations of $CF_4$ were altered into 0.2 and 2.0%, respectively. The results are given in Table 2.

EXAMPLES 46 TO 48

The procedure in Example 41 was repeated to prepare the decompositionally treating agents and carry out the decompositional treatment tests for fluorocarbons except that $C_2F_6$, $C_3F_8$ and $CHF_3$ were used, respectively as fluorocarbons in place of $CF_4$. The results are given in Table 2.

EXAMPLES 49, 50

The procedure in Example 31 was repeated to prepare the decompositionally treating agents except that lanthanum oxide in the preparation of the agent was altered into lanthanum hydroxide and lanthanum carbonate, respectively. Then the the decompositional treatment tests for $CF_4$ were carried out by the use of the resultant agents in the same manner as in Example 41. The results are given in Table 2.

EXAMPLE 51

The decompositionally treating agent which had been prepared in the same manner as in Example 31 was packed in the inside of a decompositionally treating apparatus which was made of SUS 316L, and had an inside diameter of 42 mm and a length of 1000 mm in such a constitution as illustrated on FIG. 1(B), and having a packing length of 300 mm. The agent in the apparatus was heated to 860° C. and then, gaseous nitrogen containing $CF_4$ at a flow rate of 10 mL/min, making a total flow rate of 1000 mL/min was introduced into the apparatus to decompose the $CF_4$.

During the operation, part of the decomposed gas exhausted through the exhaust port of the apparatus was collected, and analyzed for $CF_4$ at every 30 minutes interval by means of FT-IR(Fourier transform infrared spectrophotometer) and GC-TCD (thermal conductivity detector). Thus, a measurement was made of the period of time until the the decomposition rate of $CF_4$ came to be less than 99.9% to determine the decompositional treatment amount of $CF_4$(L) (decompositional treatment performance) per one liter of the decompositionally treating agent and also to examine the existence of HF in the exhaust gas by the use of a detector (manufactured by GasTec Co., Ltd.). The results are given in Table 2.

EXAMPLES 52, 53

The procedure in Example 31 was repeated to prepare the decompositionally treating agents except that in preparing the agent according to Example 31, the atomic ratios of aluminum to lanthanum (Al/La) were altered into 0.25 and 1.0, respectively. Then the decompositional treatment tests for $CF_4$ were carried out by the use of the resultant agents in the same manner as in Example 51. The results are given in Table 2.

EXAMPLES 54, 55

The procedure in Example 51 was repeated to prepare the decompositionally treating agents and carry out the decompositional treatment tests for $CF_4$ except that the concentrations of $CF_4$ were altered into 0.2 and 2.0%, respectively. The results are given in Table 2.

EXAMPLES 56 TO 58

The procedure in Example 51 was repeated to prepare the decompositionally treating agents and carry out the decompositional treatment tests for fluorocarbons except that $C_2F_6$, $C_3F_8$ and $CHF_3$ were used, respectively as fluorocarbons in place of $CF_4$. The results are given in Table 2.

EXAMPLES 59, 60

The procedure in Example 31 was repeated to prepare the decompositionally treating agents except that lanthanum oxide in preparing the agent was altered into lanthanum hydroxide and lanthanum carbonate, respectively. Then the decompositional treatment tests for $CF_4$ were carried out by the use of the resultant agents in the same manner as in Example 51. The results are given in Table 2.

EXAMPLE 61

<<Preparation of Decompositionally Treating Agent>>

An alumina catalyst available on a market (average pore diameter of 130 Å, purity of 99.9%, particle diameter of 2 to 3 mm) was used as a decompositionally treating agent consisting of the granulated aluminum oxide. Lanthanum oxide available on a market (purity of 99%) was pulverized to 100 micron or smaller, packed in a mold measuring 20 mm in inside diameter and 5 mm in height, and thereafter compressed at a pressure of 150 to 160 kg/cm$^2$ for 30 seconds by the use of a hydraulic jack into a molded product, which was ground and sieved. Thus, particles passing through an aperture of 3.36 mm and not passing through an aperture of 2.00 mm were selected for use as a decompositionally treating agent consisting of the granulated lanthanum oxide.

<<Decompositional Treatment Test>>

The above-mentioned decompositionally treating agents were packed in the inside of a decompositionally treating apparatus which was made of SUS 316L, and had an inside diameter of 42 mm and a length of 1000 mm in such a constitution as illustrated on FIG. 3, wherein four layers of each of the agents were alternately laminated so as to achieve an atomic ratio (Al/La) of 0.5 and a total packing length of 600 mm. The agents in the apparatus was heated to 860° C. and then, gaseous nitrogen containing $CF_4$ at a flow rate of 10 mL/min, making a total flow rate of 877 mL/min, steam at a flow rate of 73 mL/min and oxygen at a flow rate of 50 mL/min were introduced into the apparatus to decompose the $CF_4$.

During the operation, part of the decomposed gas exhausted through the exhaust port of the apparatus was collected, and analyzed for $CF_4$ at every 30 minutes interval by means of FT-IR(Fourier transform infrared spectrophotometer) and GC-TCD (thermal conductivity detector). Thus, a measurement was made of the period of time until the the decomposition rate of $CF_4$ came to be less than 99.9% to determine the decompositional treatment amount of $CF_4$(L) (decompositional treatment performance) per one liter of the decompositionally treating agent and also to examine the existence of HF in the exhaust gas by the use of a detector (manufactured by GasTec Co., Ltd.). The results are given in Table 3.

EXAMPLES 62, 63

The procedure in Example 61 was repeated to carry out the decompositional treatment tests for $CF_4$ by the use of the agents thus prepared except that the agents were laminated so that the atomic ratios of aluminum to lanthanum (Al/La) in the treatment tests were altered into 0.25 and 1.0, respectively. The results are given in Table 3.

EXAMPLES 64, 65

The procedure in Example 61 was repeated to carry out the decompositional treatment tests for $CF_4$ except that the concentrations of $CF_4$ were altered into 0.2 and 2.0%, respectively. The results are given in Table 3.

EXAMPLES 66 TO 68

The procedure in Example 61 was repeated to carry out the decompositional treatment tests for fluorocarbons except that $C_2F_6$, $C_3F_8$ and $CHF_3$ were used, respectively as fluorocarbons in place of $CF_4$. The results are given in Table 3.

EXAMPLES 69, 70

The procedure in Example 61 was repeated to prepare the decompositionally treating agents except that lanthanum oxide in preparing the agent was altered into lanthanum hydroxide and lanthanum carbonate, respectively. Then the decompositional treatment tests for $CF_4$ were carried out by using the resultant agents in the same manner as in Example 61. The results are given in Table 3.

EXAMPLES 71 TO 73

The procedure in Example 1 was repeated to prepare the decompositionally treating agents except that the alumina catalyst having pores with an average pore diameter of 130 Å in the preparation thereof in Example 1 was altered into alumina catalysts having pores with an average pore diameter of 30 Å, 80 Å and 230 Å, respectively. Subsequently, the decompositional treatment tests for $CF_4$ were carried out by the use of the resultant agents in the same manner as in Example 1. The results are given in Table 4.

EXAMPLES 74 TO 76

The procedure in Example 31 was repeated to prepare the decompositionally treating agents except that the alumina catalyst having pores with an average pore diameter of 130 Å in the preparation thereof in Example 31 was altered into alumina catalysts having pores with an average pore diameter of 30 Å, 80 Å and 230 Å, respectively. Subsequently, the decompositional treatment tests for $CF_4$ were carried out by the use of the resultant agents in the same manner as in Example 31. The results are given in Table 5.

EXAMPLES 77 TO 79

The procedure in Example 61 was repeated to prepare the decompositionally treating agents except that the alumina catalyst having pores with an average pore diameter of 130 Å in the preparation thereof in Example 61 was altered into alumina catalysts having pores with an average pore diameter of 30 Å, 80 Å and 230 Å, respectively. Subsequently, the decompositional treatment tests for $CF_4$ were carried out by the use of the resultant agents in the same manner as in Example 61. The results are given in Table 6.

EXAMPLES 80

<<Preparation of Decompositionally Treating Agent>>

An alumina catalyst available on a market (average pore diameter of 130 Å, purity of 99.9%), lanthanum oxide (purity of 99%) and calcium oxide (purity of 99%) were each pulverized to 100 micron or smaller, and mixed with one another so as to achieve an atomic ratio (Al:La:Ca) of 5:9:1. The resultant mixture was packed in a mold measuring 20 mm in inside diameter and 5 mm in height. Thereafter the packed mixture was compressed at a pressure of 150 to 160 $kg/cm^2$ for 30 seconds by the use of a hydraulic jack into a molded product, which was ground and sieved. Thus, particles passing through an aperture of 3.36 mm and not passing through an aperture of 2.00 mm were selected for use as a decompositionally treating agent.

<<Decompositional Treatment Test>>

The above-mentioned decompositionally treating agent was packed in the inside of a decompositionally treating apparatus which was made of SUS 316L, and had an inside diameter of 42 mm and a length of 1000 mm in such a constitution as illustrated on FIG. 2(A) and having a packing length of 300 mm. The agent in the apparatus was heated to 860° C. and then, gaseous nitrogen containing $CF_4$ at a flow rate of 10 mL/min, making a total flow rate of 877 mL/min, steam at a flow rate of 73 mL/min and oxygen at a flow rate of 50 mL/min were introduced into the apparatus to decompose the $CF_4$.

During the operation, part of the decomposed gas exhausted through the exhaust port of the apparatus was collected, and analyzed for $CF_4$ at every 30 minutes interval by means of FT-IR(Fourier transform infrared spectrophotometer) and GC-TCD (thermal conductivity detector). Thus, a measurement was made of the period of time until the the decomposition rate of $CF_4$ came to be less than 99.9% to determine the decompositional treatment amount of $CF_4$(L) (decompositional treatment performance) per one liter of the decompositionally treating agent and also to examine the existence of HF in the exhaust gas by the use of a detector (manufactured by GasTec Co., Ltd.). The results are given in Table 7.

EXAMPLES 81, 82

The procedure in Example 80 was repeated to prepare the decompositionally treating agents and carry out the decompositional treatment tests for $CF_4$ by the use of the agents thus prepared except that the atomic ratios (Al:La:Ca) were altered into 5:18:2 and 10:9:1, respectively. The results are given in Table 7.

EXAMPLES 83, 84

The procedure in Example 80 was repeated to prepare the decompositionally treating agents and carry out the decompositional treatment tests for $CF_4$ except that the concentrations of $CF_4$ were altered into 0.2 and 2.0%, respectively. The results are given in Table 7.

EXAMPLES 85 TO 87

The procedure in Example 80 was repeated to prepare the decompositionally treating agents and carry out the decompositional treatment tests for fluorocarbons except that $C_2F_6$, $C_3F_8$ and $CHF_3$ were used, respectively as fluorocarbons in place of $CF_4$. The results are given in Table 7.

EXAMPLES 88, 89

The procedure in Example 80 was repeated to prepare the decompositionally treating agents and carry out the decompositional treatment tests for $CF_4$ except that lanthanum oxide in preparing the agent was altered into lanthanum hydroxide and lanthanum carbonate, respectively. The results are given in Table 7.

EXAMPLES 90

The decompositionally treating agent which had been prepared in the same manner as in Example 80 was packed in the inside of a decompositionally treating apparatus which was made of SUS 316L, and had an inside diameter of 42 mm and a length of 1000 mm in such a constitution as illustrated on FIG. 2(A) and having a packing length of 300 mm. The agent in the apparatus was heated to 860° C. and then, gaseous nitrogen containing $CF_4$ at a flow rate of 10 mL/min, making a total flow rate of 950 mL/min, and oxygen at a flow rate of 50 mL/min were introduced into the apparatus to decompose the $CF_4$.

During the operation, part of the decomposed gas exhausted through the exhaust port of the apparatus was collected, and analyzed for $CF_4$ at every 30 minutes interval by means of FT-IR(Fourier transform infrared spectrophotometer) and GC-TCD (thermal conductivity detector). Thus, a measurement was made of the period of time until the the decomposition rate of $CF_4$ came to be less than 99.9% to determine the decompositional treatment amount of $CF_4$(L) (decompositional treatment performance) per one liter of the decompositionally treating agent and also to examine the existence of HF in the exhaust gas by the use of a detector (manufactured by GasTec Co., Ltd.). The results are given in Table 7.

EXAMPLES 91, 92

The procedure in Example 80 was repeated to prepare the decompositionally treating agents except that the atomic ratios (Al:La:Ca) were altered into 5:18:2 and 10:9:1, respectively. Then the decompositional treatment tests for $CF_4$ were carried out by the use of the resultant agents in the same manner as in Example 90. The results are given in Table 7.

EXAMPLES 93, 94

The procedure in Example 90 was repeated to prepare the decompositionally treating agents and carry out the decompositional treatment tests for $CF_4$ except that the concentrations of $CF_4$ were altered into 0.2 and 2.0%, respectively. The results are given in Table 7.

EXAMPLES 95 to 97

The procedure in Example 90 was repeated to prepare the decompositionally treating agents and carry out the decompositional treatment tests for fluorocarbons except that $C_2F_6$, $C_3F_8$ and $CHF_3$ were used, respectively as fluorocarbons in place of $CF_4$. The results are given in Table 7.

EXAMPLES 98, 99

The procedure in Example 80 was repeated to prepare the decompositionally treating agents except that lanthanum oxide in the preparation of the agent was altered into lanthanum hydroxide and lanthanum carbonate, respectively. Then the decompositional treatment tests for $CF_4$ were carried out by the use of the resultant agents in the same manner as in Example 90. The results are given in Table 7.

EXAMPLE 100

The decompositionally treating agent which had been prepared in the same manner as in Example 80 was packed in the inside of a decompositionally treating apparatus which was made of SUS 316L, and had an inside diameter of 42 mm and a length of 1000 mm in such a constitution as illustrated on FIG. 2(A), and having a packing length of 300 mm. The agent in the apparatus was heated to 860° C. and then, gaseous nitrogen containing $CF_4$ at a flow rate of 10 mL/min, making a total flow rate of 1000 mL/min was introduced into the apparatus to decompose the $CF_4$.

During the operation, part of the decomposed gas exhausted through the exhaust port of the apparatus was collected, and analyzed for $CF_4$ at every 30 minutes interval by means of FT-IR(Fourier transform infrared spectrophotometer) and GC-TCD (thermal conductivity detector). Thus, a measurement was made of the period of time until the the decomposition rate of $CF_4$ came to be less than 99.9% to determine the decompositional treatment amount of $CF_4$(L) (decompositional treatment performance) per one liter of the decompositionally treating agent and also to examine the existence of HF in the exhaust gas by the use of a detector (manufactured by GasTec Co., Ltd.). The results are given in Table 7.

EXAMPLES 101, 102

The procedure in Example 80 was repeated to prepare the decompositionally treating agents except that the atomic ratios (Al:La:Ca) were altered into 5:18:2 and 10:9:1, respectively. Then the decompositional treatment tests for $CF_4$ were carried out by the use of the resultant agents in the same manner as in Example 100. The results are given in Table 7.

EXAMPLES 103, 104

The procedure in Example 100 was repeated to prepare the decompositionally treating agents and carry out the decompositional treatment tests for $CF_4$ except that the concentrations of $CF_4$ were altered into 0.2 and 2.0%, respectively. The results are given in Table 7.

EXAMPLES 105 TO 107

The procedure in Example 100 was repeated to prepare the decompositionally treating agents and carry out the decompositional treatment tests for fluorocarbons except that $C_2F_6$, $C_3F_8$ and $CHF_3$ were used, respectively as fluorocarbons in place of $CF_4$. The results are given in Table 7.

EXAMPLES 108, 109

The procedure in Example 80 was repeated to prepare the decompositionally treating agents except that lanthanum oxide in preparing the agent was altered into lanthanum hydroxide and lanthanum carbonate, respectively. Then the decompositional treatment tests for $CF_4$ were carried out by using the resultant agents in the same manner as in Example 100. The results are given in Table 7.

EXAMPLE 110

<<Preparation of Decompositionally Treating Agent>>

An alumina catalyst available on a market (average pore diameter of 130 Å, purity of 99.9%, particle diameter of 2 to 3 mm) was used as a granulated aluminum oxide. Also lanthanum oxide available on a market (purity of 99%) was pulverized to 100 micron or smaller, packed in a mold measuring 20 mm in inside diameter and 5 mm in height, and thereafter was compressed at a pressure of 150 to 160 $kg/cm^2$ for 30 seconds by the use of a hydraulic jack into a molded product, which was ground and sieved. Thus, particles passing through an aperture of 3.36 mm and not passing through an aperture of 2.00 mm were selected for use as a granulated lanthanum oxide. Further, calcium oxide available on a market (purity of 99%), which was molded and sieved in the same manner as the above was used as a granulated calcium oxide. The granulated products were mixed with one another so as to achieve an atomic ratio (Al:La:Ca) of 5:9:1 for use as the decompositionally treating agent.

<<Decompositional Treatment Test>>

The above-mentioned decompositionally treating agent was packed in the inside of a decompositionally treating apparatus which was made of SUS 316L, and had an inside diameter of 42 mm and a length of 1000 mm in such a constitution as illustrated on FIG. 2(B), and having a packing length of 300 mm. The agent in the apparatus was heated to 860° C. and then, gaseous nitrogen containing $CF_4$ at a flow rate of 10 mL/min, making a total flow rate of 877 mL/min, steam at a flow rate of 73 mL/min and oxygen at a flow rate of 50 mL/min were introduced into the apparatus to decompose the $CF_4$.

During the operation, part of the decomposed gas exhausted through the exhaust port of the apparatus was collected, and analyzed for $CF_4$ at every 30 minutes interval by means of FT-IR(Fourier transform infrared spectrophotometer) and GC-TCD (thermal conductivity detector). Thus, a measurement was made of the period of time until the the decomposition rate of $CF_4$ came to be less than 99.9% to determine the decompositional treatment amount of $CF_4$(L) (decompositional treatment performance) per one liter of the decompositionally treating agent and also to examine the existence of HF in the exhaust gas by the use of a detector (manufactured by GasTec Co., Ltd.). The results are given in Table 8.

EXAMPLES 111, 112

The procedure in Example 110 was repeated to prepare the decompositionally treating agents except that the atomic ratios (Al:La:Ca) were altered into 5:18:2 and 10:9:1, respectively. Then the decompositional treatment tests for $CF_4$ were carried out by the use of the resultant agents in the same manner as in Example 110. The results are given in Table 8.

EXAMPLES 113, 114

The procedure in Example 110 was repeated to prepare the decompositionally treating agents and carry out the decompositional treatment tests for $CF_4$ except that the concentrations of $CF_4$ were altered into 0.2 and 2.0%, respectively. The results are given in Table 8.

EXAMPLES 115 TO 117

The procedure in Example 110 was repeated to prepare the decompositionally treating agents and carry out the decompositional treatment tests for fluorocarbons except that $C_2F_6$, $C_3F_8$ and $CHF_3$ were used, respectively as fluorocarbons in place of $CF_4$. The results are given in Table 8.

EXAMPLES 118, 119

The procedure in Example 110 was repeated to prepare the decompositionally treating agents except that lanthanum oxide in preparing the agent was altered into lanthanum hydroxide and lanthanum carbonate, respectively. Then the decompositional treatment tests for $CF_4$ were carried out by using the resultant agents in the same manner as in Example 110. The results are given in Table 8.

EXAMPLE 120

The decompositionally treating agent which had been prepared in the same manner as in Example 110 was packed in the inside of a decompositionally treating apparatus which was made of SUS 316L, and had an inside diameter of 42 mm and a length of 1000 mm in such a constitution as illustrated on FIG. 2(B) and having a packing length of 300 mm. The agent in the apparatus was heated to 860° C. and then, gaseous nitrogen containing $CF_4$ at a flow rate of 10 mL/min, making a total flow rate of 950 mL/min, and oxygen at a flow rate of 50 mL/min were introduced into the apparatus to decompose the $CF_4$.

During the operation, part of the decomposed gas exhausted through the exhaust port of the apparatus was collected, and analyzed for $CF_4$ at every 30 minutes interval by means of FT-IR(Fourier transform infrared spectrophotometer) and GC-TCD (thermal conductivity detector). Thus, a measurement was made of the period of time until the the decomposition rate of $CF_4$ came to be less than 99.9% to determine the decompositional treatment amount of $CF_4$(L) (decompositional treatment performance) per one liter of the decompositionally treating agent and also to examine the existence of HF in the exhaust gas by the use of a detector (manufactured by GasTec Co., Ltd.). The results are given in Table 8.

EXAMPLES 121, 122

The procedure in Example 110 was repeated to prepare the decompositionally treating agents except that the atomic ratios (Al:La:Ca) were altered into 5:18:2 and 10:9:1, respectively. Then the decompositional treatment tests for $CF_4$ were carried out by the use of the resultant agents in the same manner as in Example 120. The results are given in Table 8.

EXAMPLES 123, 124

The procedure in Example 120 was repeated to prepare the decompositionally treating agents and carry out the decompositional treatment tests for $CF_4$ except that the concentrations of $CF_4$ were altered into 0.2 and 2.0%, respectively. The results are given in Table 8.

EXAMPLES 125 TO 127

The procedure in Example 120 was repeated to prepare the decompositionally treating agents and carry out the decompositional treatment tests for fluorocarbons except that $C_2F_6$, $C_3F_8$ and $CHF_3$ were used, respectively as fluorocarbons in place of $CF_4$. The results are given in Table 8.

EXAMPLES 128, 129

The procedure in Example 110 was repeated to prepare the decompositionally treating agents except that lanthanum oxide in preparing the agent was altered into lanthanum hydroxide and lanthanum carbonate, respectively. Then the decompositional treatment tests for $CF_4$ were carried out by using the resultant agents in the same manner as in Example 120. The results are given in Table 8.

EXAMPLES 130

The decompositionally treating agent which had been prepared in the same manner as in Example 110 was packed in the inside of a decompositionally treating apparatus which was made of SUS 316L, and had an inside diameter of 42 mm and a length of 1000 mm in such a constitution as illustrated on FIG. 2(B), and having a packing length of 300 mm. The agent in the apparatus was heated to 860° C. and then, gaseous nitrogen containing $CF_4$ at a flow rate of 10 mL/min, making a total flow rate of 1000 mL/min was introduced into the apparatus to decompose the $CF_4$.

During the operation, part of the decomposed gas exhausted through the exhaust port of the apparatus was collected, and analyzed for $CF_4$ at every 30 minutes interval by means of FT-IR(Fourier transform infrared spectrophotometer) and GC-TCD (thermal conductivity detector). Thus, a measurement was made of the period of time until the the decomposition rate of $CF_4$ came to be less than 99.9% to determine the decompositional treatment amount of $CF_4$(L) (decompositional treatment performance) per one liter of the decompositionally treating agent and also to examine the existence of HF in the exhaust gas by the use of a detector (manufactured by GasTec Co., Ltd.). The results are given in Table 8.

EXAMPLES 131, 132

The procedure in Example 110 was repeated to prepare the decompositionally treating agents except that the atomic ratios (Al:La:Ca) were altered into 5:18:2 and 10:9:1, respectively. Then the decompositional treatment tests for $CF_4$ were carried out by the use of the resultant agents in the same manner as in Example 130. The results are given in Table 8.

EXAMPLES 133, 134

The procedure in Example 130 was repeated to prepare the decompositionally treating agents and carry out the decompositional treatment tests for $CF_4$ except that the concentrations of $CF_4$ were altered into 0.2 and 2.0%, respectively. The results are given in Table 8.

EXAMPLES 135 TO 137

The procedure in Example 130 was repeated to prepare the decompositionally treating agents and carry out the decompositional treatment tests for fluorocarbons except that $C_2F_6$, $C_3F_8$ and $CHF_3$ were used, respectively as fluorocarbons in place of $CF_4$. The results are given in Table 8.

EXAMPLES 138, 139

The procedure in Example 110 was repeated to prepare the decompositionally treating agents except that calcium oxide in the preparation of the agent was altered into magnesium oxide and strontium oxide, respectively. Then the decompositional treatment tests for $CF_4$ were carrid out by the use of the resultant agents in the same manner as in Example 130 . The results are given in Table 8.

EXAMPLE 140

<<Preparation of Decompositionally Treating Agent>>

An alumina catalyst available on a market (average pore diameter of 130 Å, purity of 99.9%, particle diameter of 2 to 3 mm) was used as a granulated aluminum oxide. Also lanthanum oxide available on a market (purity of 99%) and calcium oxide available on a market (purity of 99%) were pulverized to 100 micron or smaller, and mixed with each other so as to achieve an atomic ratio (Al:Ca) of 9:1. The resultant mixture was packed in a mold measuring 20 mm in inside diameter and 5 mm in height, and thereafter was compressed at a pressure of 150 to 160 kg/cm$^2$ for 30 seconds by the use of a hydraulic jack into a molded product, which was ground and sieved. Thus, particles passing through an aperture of 3.36 mm and not passing through an aperture of 2.00 mm were selected for use as a mixed granules of lanthanum oxide and calcium oxide. Further, the above-prepared granulated aluminum oxide and the mixed granules of lanthanum oxide and calcium oxide were mixed with each other so as to achieve an atomic ratio (Al:La:Ca) of 5:9:1 for use as the decompositionally treating agent.

<<Decompositional Treatment Test>>

The above-mentioned decompositionally treating agent was packed in the inside of a decompositionally treating apparatus which was made of SUS 316L, and had an inside diameter of 42 mm and a length of 1000 mm in such a constitution as illustrated on FIG. 2(C) and having a packing length of 300 mm. The agent in the apparatus was heated to 860° C. and then, gaseous nitrogen containing $CF_4$ at a flow rate of 10 mL/min, making a total flow rate of 877 mL/min, steam at a flow rate of 73 mL/min and oxygen at a flow rate of 50 mL/min were introduced into the apparatus to decompose the $CF_4$.

During the operation, part of the decomposed gas exhausted through the exhaust port of the apparatus was collected, and analyzed for $CF_4$ at every 30 minutes interval by means of FT-IR(Fourier transform infrared spectrophotometer) and GC-TCD (thermal conductivity detector). Thus, a measurement was made of the period of time until the the decomposition rate of $CF_4$ came to be less than 99.9% to determine the decompositional treatment amount of $CF_4$(L) (decompositional treatment performance) per one liter of the decompositionally treating agent and also to examine the existence of HF in the exhaust gas by the use of a detector (manufactured by GasTec Co., Ltd.). The results are given in Table 9.

EXAMPLES 141, 142

The procedure in Example 140 was repeated to prepare the decompositionally treating agents and carry out the decompositional treatment tests for $CF_4$ by the use of the agents thus prepared except that the atomic ratios (Al:La:Ca) were altered into 5:18:2 and 10:9:1, respectively. The results are given in Table 9.

EXAMPLES 143, 144

The procedure in Example 140 was repeated to prepare the decompositionally treating agents and carry out the decompositional treatment tests for $CF_4$ except that the concentrations of $CF_4$ were altered into 0.2 and 2.0%, respectively. The results are given in Table 9.

EXAMPLES 145 TO 147

The procedure in Example 140 was repeated to prepare the decompositionally treating agents and carry out the decompositional treatment tests for fluorocarbons except that $C_2F_6$, $C_3F_8$ and $CHF_3$ were used, respectively as fluorocarbons in place of $CF_4$. The results are given in Table 9.

EXAMPLES 148, 149

The procedure in Example 140 was repeated to prepare the decompositionally treating agents except that lanthanum oxide in the preparation of the agent was altered into lanthanum hydroxide and lanthanum carbonate, respectively. Then the decompositional treatment tests for $CF_4$ were carried out by the use of the resultant agents in the same manner as in Example 140. The results are given in Table 9.

EXAMPLE 150

The decompositionally treating agent which had been prepared in the same manner as in Example 140 was packed in the inside of a decompositionally treating apparatus which was made of SUS 316L, and had an inside diameter of 42 mm and a length of 1000 mm in such a constitution as illustrated on FIG. 2(C), and having a packing length of 300 mm. The agent in the apparatus was heated to 860° C. and then, gaseous nitrogen containing $CF_4$ at a flow rate of 10 mL/min, making a total flow rate of 950 mL/min, and oxygen at a flow rate of 50 mL/min were introduced into the apparatus to decompose the $CF_4$.

During the operation, part of the decomposed gas exhausted through the exhaust port of the apparatus was collected, and analyzed for $CF_4$ at every 30 minutes interval by means of FT-IR(Fourier transform infrared spectrophotometer) and GC-TCD (thermal conductivity detector). Thus, a measurement was made of the period of time until the the decomposition rate of $CF_4$ came to be less than 99.9% to determine the decompositional treatment amount of $CF_4$(L) (decompositional treatment performance) per one liter of the decompositionally treating agent and also to examine the existence of HF in the exhaust gas by the use of a detector (manufactured by GasTec Co., Ltd.). The results are given in Table 9.

EXAMPLES 151, 152

The procedure in Example 140 was repeated to prepare the decompositionally treating agents except that in preparing the agent according to Example 140, the atomic ratios (Al:La:Ca) were altered into 5:18:2 and 10:9:1, respectively. Then, the decompositional treatment tests for $CF_4$ were carried out by the use of the resultant agents in the same manner as in Example 150. The results are given in Table 9.

EXAMPLES 153, 154

The procedure in Example 150 was repeated to prepare the decompositionally treating agents and carry out the decompositional treatment tests for $CF_4$ except that the concentrations of $CF_4$ were altered into 0.2 and 2.0%, respectively. The results are given in Table 9.

EXAMPLES 155 TO 157

The procedure in Example 150 was repeated to prepare the decompositionally treating agents and carry out the decompositional treatment tests for fluorocarbons except that $C_2F_6$, $C_3F_8$ and $CHF_3$ were used, respectively as fluorocarbons in place of $CF_4$. The results are given in Table 9.

EXAMPLES 158, 159

The procedure in Example 140 was repeated to prepare the decompositionally treating agents except that lanthanum oxide in the preparation of the agent was altered into lanthanum hydroxide and lanthanum carbonate, respectively. Then the decompositional treatment tests for $CF_4$ were carried out by the use of the resultant agents in the same manner as in Example 150. The results are given in Table 9.

EXAMPLE 160

The decompositionally treating agent which had been prepared in the same manner as in Example 140 was packed in the inside of a decompositionally treating apparatus which was made of SUS 316L and had an inside diameter of 42 mm and a length of 1000 mm in such a constitution as illustrated on FIG. 2(C), and having a packing length of 300 mm. The agent in the apparatus was heated to 860° C. and then, gaseous nitrogen containing $CF_4$ at a flow rate of 10 mL/min, making a total flow rate of 1000 mL/min was introduced into the apparatus to decompose the $CF_4$.

During the operation, part of the decomposed gas exhausted through the exhaust port of the apparatus was collected, and analyzed for $CF_4$ at every 30 minutes interval by means of FT-IR(Fourier transform infrared spectrophotometer) and GC-TCD (thermal conductivity detector). Thus, a measurement was made of the period of time until the the decomposition rate of $CF_4$ came to be less than 99.9% to determine the decompositional treatment amount of $CF_4$ (L) (decompositional treatment performance) per one liter of the decompositionally treating agent and also to examine the existence of HF in the exhaust gas by the use of a detector (manufactured by GasTec Co., Ltd.). The results are given in Table 9.

EXAMPLES 161, 162

The procedure in Example 140 was repeated to prepare the decompositionally treating agents except that in preparing the agent according to Example 140, the atomic ratios (Al:La:Ca) were altered into 5:18:2 and 10:9:1, respectively. Then the decompositional treatment tests for $CF_4$ were carried out by the use of the resultant agents in the same manner as in Example 160. The results are given in Table 9.

EXAMPLES 163, 164

The procedure in Example 160 was repeated to prepare the decompositionally treating agents and carry out the decompositional treatment tests for $CF_4$ except that the concentrations of $CF_4$ were altered into 0.2 and 2.0%, respectively. The results are given in Table 9.

EXAMPLES 165 TO 167

The procedure in Example 160 was repeated to prepare the decompositionally treating agents and carry out the decompositional treatment tests for fluorocarbons except that $C_2F_6$, $C_3F_8$ and $CHF_3$ were used, respectively as fluorocarbons in place of $CF_4$. The results are given in Table 9.

EXAMPLES 168, 169

The procedure in Example 140 was repeated to prepare the decompositionally treating agents except that calcium oxide in the preparation of the agent was altered into calcium hydroxide and magnesium hydroxide, respectively. Then the decompositional treatment tests for $CF_4$ were carried out by the use of the resultant agents in the same manner as in Example 160. The results are given in Table 9.

EXAMPLE 170

<<Preparation of Decompositionally Treating Agent>>

An alumina catalyst available on a market (average pore diameter of 130 Å, purity of 99.9%, particle diameter of 2 to 3 mm) was used as a decompositionally treating agent consisting of the granulated aluminum oxide. Lanthanum oxide available on a market (purity of 99%) was pulverized to 100 micron or smaller, packed in a mold measuring 20 mm in inside diameter and 5 mm in height, and thereafter compressed at a pressure of 150 to 160 kg/cm$^2$ for 30 seconds by the use of a hydraulic jack into a molded product, which was ground and sieved. Thus, particles passing through an aperture of 3.36 mm and not passing through an aperture of 2.00 mm were selected for use as a decompositionally treating agent consisting of the granulated lanthanum oxide. Further, calcium oxide available on a market (purity of 99%) was molded and sieved in the same manner as the foregoing for use as a decompositionally treating agent consisting of the granulated calcium oxide.

<<Decompositional Treatment Test>>

The above-mentioned decompositionally treating agents were packed each in the inside of a decompositionally treating apparatus which was made of SUS 316L, and had an inside diameter of 42 mm and a length of 1000 mm in such a constitution as illustrated on FIG. 4(A), wherein each of the agents was alternately laminated in two layers, respectively so as to achieve an atomic ratio (Al:La:Ca) of 5:9:1 and a total packing length of 600 mm. The agents constituting a composite treating agent in the apparatus were heated to 860° C. and then, gaseous nitrogen containing $CF_4$ at a flow rate of 10 mL/min, making a total flow rate of 877 mL/min, steam at a flow rate of 73 mL/min and oxygen at a flow rate of 50 mL/min were introduced into the apparatus to decompose the $CF_4$.

During the operation, part of the decomposed gas exhausted through the exhaust port of the apparatus was collected, and analyzed for $CF_4$ at every 30 minutes interval by means of FT-IR(Fourier transform infrared spectrophotometer) and GC-TCD (thermal conductivity detector). Thus, a measurement was made of the period of time until the the decomposition rate of $CF_4$ came to be less than 99.9% to determine the decompositional treatment amount of $CF_4$(L) (decompositional treatment performance) per one liter of the composite treating agent and also to examine the existence of HF in the exhaust gas by the use of a detector (manufactured by GasTec Co., Ltd.). The results are given in Table 10.

EXAMPLES 171, 172

The procedure in Example 170 was repeated to carry out the decompositional treatment tests for $CF_4$ by the use of the composite agent thus prepared except that the agents were laminated so that atomic ratios (Al:La:Ca) were made to be 5:18:2 and 10:9:1, respectively in the decompositional treatment tests. The results are given in Table 10.

EXAMPLES 173, 174

The procedure in Example 170 was repeated to carry out the decompositional treatment tests for $CF_4$ except that the concentrations of $CF_4$ were altered into 0.2 and 2.0%, respectively. The results are given in Table 10.

EXAMPLES 175 TO 177

The procedure in Example 170 was repeated to carry out the decompositional treatment tests for fluorocarbons except that $C_2F_6$, $C_3F_8$ and $CHF_3$ were used, respectively as fluorocarbons in place of $CF_4$. The results are given in Table 10.

EXAMPLES 178, 179

The procedure in Example 170 was repeated to prepare the decompositionally treating agents except that lanthanum oxide in the preparation of the agent was altered into lanthanum hydroxide and lanthanum carbonate, respectively. Then the decompositional treatment tests for $CF_4$ were carried out by the use of the resultant agents in the same manner as in Example 170. The results are given in Table 10.

EXAMPLE 180

The decompositionally treating agents which had been prepared in the same manner as in Example 170 were packed each in the inside of a decompositionally treating apparatus which was made of SUS 316L and had an inside diameter of 42 mm and a length of 1000 mm in such a constitution as illustrated on FIG. 4(B), wherein each of the agents was alternately laminated in two layers, respectively so as to achieve an atomic ratio (Al:La:Ca) of 5:9:1 and a total packing length of 600 mm. The agents constituting a composite treating agent in the apparatus were heated to 860° C. and then, gaseous nitrogen containing $CF_4$ at a flow rate of 10 mL/min, making a total flow rate of 927 mL/min, and steam at a flow rate of 73 mL/min were introduced into the apparatus to decompose the $CF_4$.

During the operation, part of the decomposed gas exhausted through the exhaust port of the apparatus was collected, and analyzed for $CF_4$ at every 30 minutes interval by means of FT-IR(Fourier transform infrared spectrophotometer) and GC-TCD (thermal conductivity detector). Thus, a measurement was made of the period of time until the the decomposition rate of $CF_4$ came to be less than 99.9% to determine the decompositional treatment amount of $CF_4$(L) (decompositional treatment performance) per one liter of the composite agent and also to examine the existence of HF in the exhaust gas by the use of a detector (manufactured by GasTec Co., Ltd.). The results are given in Table 11.

EXAMPLES 181, 182

The procedure in Example 180 was repeated to prepare the decompositionally treating agents and carry out the decompositional treatment tests for $CF_4$ by the use of the agents thus prepared except that the agents were laminated so that the atomic ratios (Al:La:Ca) were made to be 5:18:2 and 10:9:1, respectively. The results are given in Table 11.

EXAMPLES 183, 184

The procedure in Example 180 was repeated to prepare the decompositionally treating agents and carry out the decompositional treatment tests for $CF_4$ except that the concentrations of $CF_4$ were altered into 0.2 and 2.0%, respectively. The results are given in Table 11.

EXAMPLES 185 TO 187

The procedure in Example 180 was repeated to prepare the decompositionally treating agents and carry out the decompositional treatment tests for fluorocarbons except that $C_2F_6$, $C_3F_8$ and $CHF_3$ were used, respectively as fluorocarbons in place of $CF_4$. The results are given in Table 11.

EXAMPLES 188, 189

The procedure in Example 170 was repeated to prepare the decompositionally treating agents except that lanthanum oxide in the preparation of the agent was altered into lanthanum hydroxide and lanthanum carbonate, respectively. Then the decompositional treatment tests for $CF_4$ were carried out by the use of the resultant agents in the same manner as in Example 180. The results are given in Table 11.

EXAMPLE 190

<<Preparation of Decompositionally Treating Agent>>

An alumina catalyst available on a market (average pore diameter of 130 Å, purity of 99.9%, particle diameter of 2 to 3 mm) was used as a decompositionally treating agent consisting of granulated aluminum oxide. Lanthanum oxide (purity of 99%) and calcium oxide (purity of 99%) that were available on a market were each pulverized to 100 micron or smaller, and mixed with each other so as to achieve an atomic ratio (La:Ca) of 9:1. The resultant mixture was packed in a mold measuring 20 mm in inside diameter and 5 mm in height. Thereafter the packed mixture was compressed at a pressure of 150 to 160 kg/cm$^2$ for 30 seconds by the use of a hydraulic jack into a molded product, which was ground and sieved. Thus, particles passing through an aperture of 3.36 mm and not passing through an aperture of 2.00 mm were selected for use as a decompositionally treating agent consisting of mixed granules.

<<Decompositional Treatment Test>>

The above-mentioned decompositionally treating agents were packed in the inside of a decompositionally treating apparatus which was made of SUS 316L, and had an inside diameter of 42 mm and a length of 1000 mm in such a constitution as illustrated on FIG. 5(A), wherein each of the agents was alternately laminated in three layers, respectively so as to achieve an atomic ratio (Al:La:Ca) of 5:9:1 and a total packing length of 600 mm. The agents constituting a composite treating agent in the apparatus were heated to 860° C. and then, gaseous nitrogen containing $CF_4$ at a flow rate of 10 mL/min, making a total flow rate of 877 mL/min, steam at a flow rate of 73 mL/min and oxygen at a flow rate of 50 mL/min were introduced into the apparatus to decompose the $CF_4$.

During the operation, part of the decomposed gas exhausted through the exhaust port of the apparatus was collected, and analyzed for $CF_4$ at every 30 minutes interval by means of FT-IR(Fourier transform infrared spectrophotometer) and GC-TCD (thermal conductivity detector). Thus, a measurement was made of the period of time until the the decomposition rate of $CF_4$ came to be less than 99.9% to determine the decompositional treatment amount of $CF_4$(L) (decompositional treatment performance) per one liter of the composite treating agent and also to examine the existence of HF in the exhaust gas by the use of a detector (manufactured by GasTec Co., Ltd.). The results are given in Table 12.

EXAMPLES 191, 192

The procedure in Example 190 was repeated to prepare the decompositionally treating agents except that the agents were laminated so that the atomic ratios (Al:La:Ca) were made to be 5:18:2 and 10:9:1, respectively. Then the decompositional treatment tests for $CF_4$ were carried out by the use of the resultant agents in the same manner as in Example 190. The results are given in Table 12.

EXAMPLES 193, 194

The procedure in Example 190 was repeated to prepare the decompositionally treating agents and carry out the decompositional treatment tests for $CF_4$ except that the concentrations of $CF_4$ were altered into 0.2 and 2.0%, respectively. The results are given in Table 12.

EXAMPLES 195 TO 197

The procedure in Example 190 was repeated to prepare the decompositionally treating agents and carry out the decompositional treatment tests for fluorocarbons except that $C_2F_6$, $C_3F_8$ and $CHF_3$ were used, respectively as fluorocarbons in place of $CF_4$. The results are given in Table 12.

EXAMPLES 198, 199

The procedure in Example 190 was repeated to prepare the decompositionally treating agents except that lanthanum oxide in the preparation of the agent was altered into lanthanum hydroxide and lanthanum carbonate, respectively. Then the decompositional treatment tests for $CF_4$ were carried out by the use of the resultant agents in the same manner as in Example 190. The results are given in Table 12.

EXAMPLE 200

The decompositionally treating agent which had been prepared in the same manner as in Example 170 and composed of the granulated aluminum oxide, and the decompositionally treating agent which had been prepared in the same manner as in Example 170 and composed of the mixture of the the granulated lanthanum oxide and granulated calcium oxide were packed in the inside of a decompositionally treating apparatus which was made of SUS 316L and had an inside diameter of 42 mm and a length of 1000 mm in such a constitution as illustrated on FIG. 5(B), wherein each of the agents constituting the composite agent was alternately laminated in three layers, respectively so as to achieve an atomic ratio (Al:La:Ca) of 5:9:1 and a total packing length of 600 mm. The composite agent in the apparatus was heated to 860° C. and then, gaseous nitrogen containing $CF_4$ at a flow rate of 10 mL/min, making a total flow rate of 927 mL/min, and steam at a flow rate of 73 mL/min were introduced into the apparatus to decompose the $CF_4$.

During the operation, part of the decomposed gas exhausted through the exhaust port of the apparatus was collected, and analyzed for $CF_4$ at every 30 minutes interval by means of FT-IR(Fourier transform infrared spectrophotometer) and GC-TCD (thermal conductivity detector). Thus, a measurement was made of the period of time until the the decomposition rate of $CF_4$ came to be less than 99.9% to determine the decompositional treatment amount of $CF_4$(L) (decompositional treatment performance) per one liter of the composite agent and also to examine the existence of HF in the exhaust gas by the use of a detector (manufactured by GasTec Co., Ltd.). The results are given in Table 13.

EXAMPLES 201, 202

The procedure in Example 200 was repeated to prepare the decompositionally treating agents except that the agents were laminated so that the atomic ratios (Al:La:Ca) were made to be 5:18:2 and 10:9:1, respectively. Then the decompositional treatment tests for $CF_4$ were carried out by the use of the resultant agents in the same manner as in Example 200. The results are given in Table 13.

EXAMPLES 203, 204

The procedure in Example 200 was repeated to prepare the decompositionally treating agents and carry out the decompositional treatment tests for $CF_4$ except that the concentrations of $CF_4$ were altered into 0.2 and 2.0%, respectively. The results are given in Table 13.

EXAMPLES 205 TO 207

The procedure in Example 200 was repeated to prepare the decompositionally treating agents and carry out the decompositional treatment tests for fluorocarbons except that $C_2F_6$, $C_3F_8$ and $CHF_3$ were used, respectively as fluorocarbons in place of $CF_4$. The results are given in Table 13.

EXAMPLES 208, 209

The procedure in Example 200 was repeated to prepare the decompositionally treating agents except that lanthanum oxide in the preparation of the agent was altered into lanthanum hydroxide and lanthanum carbonate, respectively. Then the decompositional treatment tests for $CF_4$ were carried out by the use of the resultant agents in the same manner as in Example 200. The results are given in Table 13.

EXAMPLES 210 TO 213

The procedure in Example 80 was repeated to prepare the decompositionally treating agents except that the atomic ratios (Al:La:Ca) were made to be (5:7:3), (5:5:5), (5:3:7) and (5:1:9), respectively. Then the decompositional treatment tests for $CF_4$ were carried out by the use of the resultant agents in the same manner as in Example 80. The results are given in Table 14.

EXAMPLES 214 TO 217

The procedure in Example 110 was repeated to prepare the decompositionally treating agents except that the atomic ratios (Al:La:Ca) were made to be (5:7:3), (5:5:5), (5:3:7) and (5:1:9), respectively. Then the decompositional treatment tests for $CF_4$ were carried out by the use of the resultant agents in the same manner as in Example 110. The results are given in Table 15.

EXAMPLES 218 TO 221

The procedure in Example 140 was repeated to prepare the decompositionally treating agents except that the atomic ratios (Al:La:Ca) were made to be (5:7:3), (5:5:5), (5:3:7) and (5:1:9), respectively. Then the decompositional treatment tests for $CF_4$ were carried out by the use of the resultant agents in the same manner as in Example 140. The results are given in Table 16.

Comparative Example 1

An alumina catalyst available on a market (average pore diameter of 130 Å, purity of 99.9%, particle diameter of 2 to 3 mm) was used as a decompositionally treating agent consisting of granulated aluminum oxide, and was packed in the inside of a decompositionally treating apparatus which was made of SUS 316L, and had an inside diameter of 42 mm and a length of 1000 mm so as to achieve a packing length of 300 mm. The agent in the apparatus was heated to 860° C. and thereafter, gaseous nitrogen containing $CF_4$ at a flow rate of 10 mL/min, making a total flow rate of 950 mL/min and oxygen at a flow rate of 50 mL/min were introduced into the apparatus to decompose the $CF_4$.

In the same manner as in Example 1 during the operation, a measurement was made of the period of time until the decomposition rate of $CF_4$ came to be less than 99.9% to determine the decompositional treatment amount of $CF_4$(L) (decompositional treatment performance) per one liter of the decompositionally treating agent and also to examine the existence of HF in the exhaust gas by the use of a detector (manufactured by GasTec Co., Ltd.). The results are given in Table 17.

Comparative Example 2

An alumina catalyst available on a market (average pore diameter of 130 Å, purity of 99.9%, particle diameter of 2 to 3 mm) was used as a decompositionally treating agent consisting of granulated aluminum oxide, and was packed in the inside of a decompositionally treating apparatus which was made of SUS 316L, and had an inside diameter of 42 mm and a length of 1000 mm so as to achieve a packing length of 300 mm. The agent in the apparatus was heated to 860° C. and thereafter, gaseous nitrogen containing $CF_4$ at a flow rate of 10 mL/min, making a total flow rate of 877 mL/min, steam at a flow rate of 73 mL/min and oxygen at a flow rate of 50 mL/min were introduced into the apparatus to decompose the $CF_4$.

In the same manner as in Example 1 during the operation, a measurement was made of the period of time until the decomposition rate of $CF_4$ came to be less than 99.9% to determine the decompositional treatment amount of $CF_4$(L) (decompositional treatment performance) per one liter of the decompositionally treating agent and also to examine the existence of HF in the exhaust gas by the use of a detector (manufactured by GasTec Co., Ltd.). The results are given in Table 17.

TABLE 1

| | Decompositionally treating agent (Ratio of number of atoms) decompositionally treationg apparatus(FIG. 1 (A)) | Fluorocarbon | Concentration (%) | Coexisting gas | Decompositional treatment temperature (° C.) | Decompotsition rate (%) | Decompositional treatment performance | HF exhaust |
|---|---|---|---|---|---|---|---|---|
| Example 1 | $Al_2O_3$, $La_2O_3$ (1:2) | $CF_4$ | 1.0 | $O_2$, $H_2O$ | 860 | 99.9 | 120 | no |
| Example 2 | $Al_2O_3$, $La_2O_3$ (1:4) | $CF_4$ | 1.0 | $O_2$, $H_2O$ | 860 | 99.9 | 61 | no |
| Example 3 | $Al_2O_3$, $La_2O_3$ (1:1) | $CF_4$ | 1.0 | $O_2$, $H_2O$ | 860 | 99.9 | 56 | no |
| Example 4 | $Al_2O_3$, $La_2O_3$ (1:2) | $CF_4$ | 0.2 | $O_2$, $H_2O$ | 860 | 99.9 | 118 | no |
| Example 5 | $Al_2O_3$, $La_2O_3$ (1:2) | $CF_4$ | 2.0 | $O_2$, $H_2O$ | 860 | 99.9 | 121 | no |
| Example 6 | $Al_2O_3$, $La_2O_3$ (1:2) | $C_2F_6$ | 1.0 | $O_2$, $H_2O$ | 860 | 99.9 | 80 | no |
| Example 7 | $Al_2O_3$, $La_2O_3$ (1:2) | $C_5F_8$ | 1.0 | $O_2$, $H_2O$ | 860 | 99.9 | 61 | no |

TABLE 1-continued

| | Decompositionally treating agent (Ratio of number of atoms) decompositionally treationg apparatus(FIG. 1 (A)) | Fluorocarbon | Concen-tration (%) | Coexisting gas | Decompositional treatment temperature (° C.) | Decompotsition rate (%) | Decompositional treatment performance | HF exhaust |
|---|---|---|---|---|---|---|---|---|
| Example 8 | $Al_2O_3$, $La_2O_3$ (1:2) | $CHF_3$ | 1.0 | $O_2$, $H_2O$ | 860 | 99.9 | 157 | no |
| Example 9 | $Al_2O_3$, $La(OH)_3$ (1:2) | $CF_4$ | 1.0 | $O_2$, $H_2O$ | 860 | 99.9 | 117 | no |
| Example 10 | $Al_2O_3$, $La(CO_3)_3$ (1:2) | $CF_4$ | 1.0 | $O_2$, $H_2O$ | 860 | 99.9 | 119 | no |
| Example 11 | $Al_2O_3$, $La_2O_3$ (1:2) | $CF_4$ | 1.0 | $O_2$ | 860 | 99.9 | 85 | no |
| Example 12 | $Al_2O_3$, $La_2O_3$ (1:4) | $CF_4$ | 1.0 | $O_2$ | 860 | 99.9 | 42 | no |
| Example 13 | $Al_2O_3$, $La_2O_3$ (1:1) | $CF_4$ | 1.0 | $O_2$ | 860 | 99.9 | 40 | no |
| Example 14 | $Al_2O_3$, $La_2O_3$ (1:2) | $CF_4$ | 0.2 | $O_2$ | 860 | 99.9 | 83 | no |
| Example 15 | $Al_2O_3$, $La_2O_3$ (1:2) | $CF_4$ | 2.0 | $O_2$ | 860 | 99.9 | 86 | no |
| Example 16 | $Al_2O_3$, $La_2O_3$ (1:2) | $C_2F_6$ | 1.0 | $O_2$ | 860 | 99.9 | 58 | no |
| Example 17 | $Al_2O_3$, $La_2O_3$ (1:2) | $C_5F_8$ | 1.0 | $O_2$ | 860 | 99.9 | 44 | no |
| Example 18 | $Al_2O_3$, $La_2O_3$ (1:2) | $CHF_3$ | 1.0 | $O_2$ | 860 | 99.9 | 111 | no |
| Example 19 | $Al_2O_3$, $La(OH)_3$ (1:2) | $CF_4$ | 1.0 | $O_2$ | 860 | 99.9 | 84 | no |
| Example 20 | $Al_2O_3$, $La(CO_3)_3$ (1:2) | $CF_4$ | 1.0 | $O_2$ | 860 | 99.9 | 83 | no |
| Example 21 | $Al_2O_3$, $La_2O_3$ (1:2) | $CF_4$ | 1.0 | — | 860 | 99.9 | 85 | no |
| Example 22 | $Al_2O_3$, $La_2O_3$ (1:4) | $CF_4$ | 1.0 | — | 860 | 99.9 | 43 | no |
| Example 23 | $Al_2O_3$, $La_2O_3$ (1:1) | $CF_4$ | 1.0 | — | 860 | 99.9 | 40 | no |
| Example 24 | $Al_2O_3$, $La_2O_3$ (1:2) | $CF_4$ | 0.2 | — | 860 | 99.9 | 82 | no |
| Example 25 | $Al_2O_3$, $La_2O_3$ (1:2) | $CF_4$ | 2.0 | — | 860 | 99.9 | 84 | no |
| Example 26 | $Al_2O_3$, $La_2O_3$ (1:2) | $C_2F_6$ | 1.0 | — | 860 | 99.9 | 56 | no |
| Example 27 | $Al_2O_3$, $La_2O_3$ (1:2) | $C_5F_8$ | 1.0 | — | 860 | 99.9 | 42 | no |
| Example 28 | $Al_2O_3$, $La_2O_3$ (1:2) | $CHF_3$ | 1.0 | — | 860 | 99.9 | 109 | no |
| Example 29 | $Al_2O_3$, $La(OH)_3$ (1:2) | $CF_4$ | 1.0 | — | 860 | 99.9 | 83 | no |
| Example 30 | $Al_2O_3$, $La(CO_3)_3$ (1:2) | $CF_4$ | 1.0 | — | 860 | 99.9 | 84 | no |

TABLE 2

| | Decompositionally treating agent (Ratio of number of atoms) decompositionally treationg apparatus(FIG. 1 (B)) | Fluorocarbon | Concen-tration (%) | Coexisting gas | Decompositional treatment temperature (° C.) | Decompotsition rate (%) | Decompositional treatment performance | HF exhaust |
|---|---|---|---|---|---|---|---|---|
| Example 31 | $Al_2O_3$, $La_2O_3$ (1:2) | $CF_4$ | 1.0 | $O_2$, $H_2O$ | 860 | 99.9 | 115 | no |
| Example 32 | $Al_2O_3$, $La_2O_3$ (1:4) | $CF_4$ | 1.0 | $O_2$, $H_2O$ | 860 | 99.9 | 57 | no |
| Example 33 | $Al_2O_3$, $La_2O_3$ (1:1) | $CF_4$ | 1.0 | $O_2$, $H_2O$ | 860 | 99.9 | 53 | no |
| Example 34 | $Al_2O_3$, $La_2O_3$ (1:2) | $CF_4$ | 0.2 | $O_2$, $H_2O$ | 860 | 99.9 | 112 | no |
| Example 35 | $Al_2O_3$, $La_2O_3$ (1:2) | $CF_4$ | 2.0 | $O_2$, $H_2O$ | 860 | 99.9 | 114 | no |
| Example 36 | $Al_2O_3$, $La_2O_3$ (1:2) | $C_2F_6$ | 1.0 | $O_2$, $H_2O$ | 860 | 99.9 | 75 | no |
| Example 37 | $Al_2O_3$, $La_2O_3$ (1:2) | $C_5F_8$ | 1.0 | $O_2$, $H_2O$ | 860 | 99.9 | 59 | no |
| Example 38 | $Al_2O_3$, $La_2O_3$ (1:2) | $CHF_3$ | 1.0 | $O_2$, $H_2O$ | 860 | 99.9 | 148 | no |
| Example 39 | $Al_2O_3$, $La(OH)_3$ (1:2) | $CF_4$ | 1.0 | $O_2$, $H_2O$ | 860 | 99.9 | 110 | no |
| Example 40 | $Al_2O_3$, $La_2(CO_3)_3$ (1:2) | $CF_4$ | 1.0 | $O_2$, $H_2O$ | 860 | 99.9 | 111 | no |
| Example 41 | $Al_2O_3$, $La_2O_3$ (1:2) | $CF_4$ | 1.0 | $O_2$ | 860 | 99.9 | 82 | no |
| Example 42 | $Al_2O_3$, $La_2O_3$ (1:4) | $CF_4$ | 1.0 | $O_2$ | 860 | 99.9 | 41 | no |
| Example 43 | $Al_2O_3$, $La_2O_3$ (1:1) | $CF_4$ | 1.0 | $O_2$ | 860 | 99.9 | 38 | no |
| Example 44 | $Al_2O_3$, $La_2O_3$ (1:2) | $CF_4$ | 0.2 | $O_2$ | 860 | 99.9 | 81 | no |
| Example 45 | $Al_2O_3$, $La_2O_3$ (1:2) | $CF_4$ | 2.0 | $O_2$ | 860 | 99.9 | 81 | no |
| Example 46 | $Al_2O_3$, $La_2O_3$ (1:2) | $C_2F_6$ | 1.0 | $O_2$ | 860 | 99.9 | 54 | no |
| Example 47 | $Al_2O_3$, $La_2O_3$ (1:2) | $C_5F_8$ | 1.0 | $O_2$ | 860 | 99.9 | 42 | no |
| Example 48 | $Al_2O_3$, $La_2O_3$ (1:2) | $CHF_3$ | 1.0 | $O_2$ | 860 | 99.9 | 105 | no |
| Example 49 | $Al_2O_3$, $La(OH)_3$ (1:2) | $CF_4$ | 1.0 | $O_2$ | 860 | 99.9 | 80 | no |
| Example 50 | $Al_2O_3$, $La_2(CO_3)_3$ (1:2) | $CF_4$ | 1.0 | $O_2$ | 860 | 99.9 | 80 | no |
| Example 51 | $Al_2O_3$, $La_2O_3$ (1:2) | $CF_4$ | 1.0 | — | 860 | 99.9 | 80 | no |
| Example 52 | $Al_2O_3$, $La_2O_3$ (1:4) | $CF_4$ | 1.0 | — | 860 | 99.9 | 40 | no |
| Example 53 | $Al_2O_3$, $La_2O_3$ (1:1) | $CF_4$ | 1.0 | — | 860 | 99.9 | 38 | no |
| Example 54 | $Al_2O_3$, $La_2O_3$ (1:2) | $CF_4$ | 0.2 | — | 860 | 99.9 | 80 | no |
| Example 55 | $Al_2O_3$, $La_2O_3$ (1:2) | $CF_4$ | 2.0 | — | 860 | 99.9 | 81 | no |
| Example 56 | $Al_2O_3$, $La_2O_3$ (1:2) | $C_2F_6$ | 1.0 | — | 860 | 99.9 | 53 | no |
| Example 57 | $Al_2O_3$, $La_2O_3$ (1:2) | $C_5F_8$ | 1.0 | — | 860 | 99.9 | 39 | no |
| Example 58 | $Al_2O_3$, $La_2O_3$ (1:2) | $CHF_3$ | 1.0 | — | 860 | 99.9 | 104 | no |
| Example 59 | $Al_2O_3$, $La(OH)_3$ (1:2) | $CF_4$ | 1.0 | — | 860 | 99.9 | 79 | no |
| Example 60 | $Al_2O_3$, $La_2(CO_3)_{3\,(1:2)}$ | $CF_4$ | 1.0 | — | 860 | 99.9 | 78 | no |

TABLE 3

| | Decompositionally treating agent (Ratio of number of atoms) decompositionally treationg apparatus(FIG. 3) | Fluorocarbon | Concen-tration (%) | Coexisting gas | Decompositional treatment temperature (° C.) | Decompotsition rate (%) | Decompositional treatment performance | HF exhaust |
|---|---|---|---|---|---|---|---|---|
| Example 61 | $Al_2O_3$, $La_2O_3$ (1:2) | $CF_4$ | 1.0 | O2, H2O | 860 | 99.9 | 110 | no |
| Example 62 | $Al_2O_3$, $La_2O_3$ (1:4) | $CF_4$ | 1.0 | O2, H2O | 860 | 99.9 | 57 | no |
| Example 63 | $Al_2O_3$, $La_2O_3$ (1:1) | $CF_4$ | 1.0 | O2, H2O | 860 | 99.9 | 52 | no |
| Example 64 | $Al_2O_3$, $La_2O_3$ (1:2) | $CF_4$ | 0.2 | O2, H2O | 860 | 99.9 | 108 | no |
| Example 65 | $Al_2O_3$, $La_2O_3$ (1:2) | $CF_4$ | 2.0 | O2, H2O | 860 | 99.9 | 112 | no |
| Example 66 | $Al_2O_3$, $La_2O_3$ (1:2) | $C_2F_6$ | 1.0 | $O_2$, $H_2O$ | 860 | 99.9 | 74 | no |
| Example 67 | $Al_2O_3$, $La_2O_3$ (1:2) | $C_5F_8$ | 1.0 | $O_2$, $H_2O$ | 860 | 99.9 | 55 | no |
| Example 68 | $Al_2O_3$, $La_2O_3$ (1:2) | $CHF_3$ | 1.0 | $O_2$, $H_2O$ | 860 | 99.9 | 141 | no |
| Example 69 | $Al_2O_3$, $La(OH)_3$ (1:2) | $CF_4$ | 1.0 | $O_2$, $H_2O$ | 860 | 99.9 | 109 | no |
| Example 70 | $Al_2O_3$, $La_2(CO_3)_3$ (1:2) | $CF_4$ | 1.0 | $O_2$, $H_2O$ | 860 | 99.9 | 107 | no |

TABLE 4

| | Decompositionally treating agent (Ratio of number of atoms) decompositionally treationg apparatus(FIG. 1 (A)) | Fluorocarbon | Concen-tration (%) | Coexisting gas | Decompositional treatment temperature (° C.) | Decompotsition rate (%) | Decompositional treatment performance | HF exhaust |
|---|---|---|---|---|---|---|---|---|
| Example 71 | $Al_2O_3$, $La_2O_3$ (1:2) | 30 | $CF_4$ | $O_2$, $H_2O$ | 860 | 99.9 | 40 | no |
| Example 72 | $Al_2O_3$, $La_2O_3$ (1:2) | 80 | $CF_4$ | $O_2$, $H_2O$ | 860 | 99.9 | 128 | no |
| Example 73 | $Al_2O_3$, $La_2O_3$ (1:2) | 230 | $CF_4$ | $O_2$, $H_2O$ | 860 | 99.9 | 46 | no |

TABLE 5

| | Decompositionally treating agent (Ratio of number of atoms) decompositionally treationg apparatus(FIG. 1 (B)) | Fluorocarbon | Concen-tration (%) | Coexisting gas | Decompositional treatment temperature (° C.) | Decompotsition rate (%) | Decompositional treatment performance | HF exhaust |
|---|---|---|---|---|---|---|---|---|
| Example 74 | $Al_2O_3$, $La_2O_3$ (1:2) | 30 | $CF_4$ | $O_2$, $H_2O$ | 860 | 99.9 | 38 | no |
| Example 75 | $Al_2O_3$, $La_2O_3$ (1:2) | 80 | $CF_4$ | $O_2$, $H_2O$ | 860 | 99.9 | 120 | no |
| Example 76 | $Al_2O_3$, $La_2O_3$ (1:2) | 230 | $CF_4$ | $O_2$, $H_2O$ | 860 | 99.9 | 45 | no |

TABLE 6

| | Decompositionally treating agent (Ratio of number of atoms) decompositionally treationg apparatus(FIG. 3) | Fluorocarbon | Concen-tration (%) | Coexisting gas | Decompositional treatment temperature (° C.) | Decompotsition rate (%) | Decompositional treatment performance | HF exhaust |
|---|---|---|---|---|---|---|---|---|
| Example 77 | $Al_2O_3$, $La_2O_3$ (1:2) | 30 | $CF_4$ | $O_2$, $H_2O$ | 860 | 99.9 | 36 | no |
| Example 78 | $Al_2O_3$, $La_2O_3$ (1:2) | 80 | $CF_4$ | $O_2$, $H_2O$ | 860 | 99.9 | 115 | no |
| Example 79 | $Al_2O_3$, $La_2O_3$ (1:2) | 230 | $CF_4$ | $O_2$, $H_2O$ | 860 | 99.9 | 42 | no |

TABLE 7

| | Decompositionally treating agent (Ratio of number of atoms) decompositionally treationg apparatus(FIG. 2 (A)) | Fluorocarbon | Concen-tration (%) | Coexisting gas | Decompositional treatment temperature (° C.) | Decompotsition rate (%) | Decompositional treatment performance | HF exhaust |
|---|---|---|---|---|---|---|---|---|
| Example 80 | $Al_2O_3$, $La_2O_3$,CaO (5:9:1) | $CF_4$ | 1.0 | $O_2$, $H_2O$ | 860 | 99.9 | 116 | no |
| Example 81 | $Al_2O_3$, $La_2O_3$,CaO (5:18:2) | $CF_4$ | 1.0 | $O_2$, $H_2O$ | 860 | 99.9 | 58 | no |
| Example 82 | $Al_2O_3$, $La_2O_3$,CaO (10:9:1) | $CF_4$ | 1.0 | $O_2$, $H_2O$ | 860 | 99.9 | 54 | no |
| Example 83 | $Al_2O_3$, $La_2O_3$,CaO (5:9:1) | $CF_4$ | 0.2 | $O_2$, $H_2O$ | 860 | 99.9 | 115 | no |
| Example 84 | $Al_2O_3$, $La_2O_3$,CaO (5:9:1) | $CF_4$ | 2.0 | $O_2$, $H_2O$ | 860 | 99.9 | 116 | no |
| Example 85 | $Al_2O_3$, $La_2O_3$,CaO (5:9:1) | $C_2F_6$ | 1.0 | $O_2$, $H_2O$ | 860 | 99.9 | 78 | no |
| Example 86 | $Al_2O_3$, $La_2O_3$,CaO (5:9:1) | $C_5F_8$ | 1.0 | $O_2$, $H_2O$ | 860 | 99.9 | 59 | no |
| Example 87 | $Al_2O_3$, $La_2O_3$,CaO (5:9:1) | $CHF_3$ | 1.0 | $O_2$, $H_2O$ | 860 | 99.9 | 151 | no |
| Example 88 | $Al_2O_3$, $La(OH)_3$, CaO (5:9:1) | $CF_4$ | 1.0 | $O_2$, $H_2O$ | 860 | 99.9 | 112 | no |
| Example 89 | $Al_2O_3$, $La_2(CO_3)_3$, CaO (5:1:9) | $CF_4$ | 1.0 | $O_2$, $H_2O$ | 860 | 99.9 | 115 | no |
| Example 90 | $Al_2O_3$, $La_2O_3$,CaO (5:9:1) | $CF_4$ | 1.0 | $O_2$ | 860 | 99.9 | 80 | no |
| Example 91 | $Al_2O_3$, $La_2O_3$,CaO (5:18:2) | $CF_4$ | 1.0 | $O_2$ | 860 | 99.9 | 41 | no |
| Example 92 | $Al_2O_3$, $La_2O_3$,CaO (10:9:1) | $CF_4$ | 1.0 | $O_2$ | 860 | 99.9 | 38 | no |
| Example 93 | $Al_2O_3$, $La_2O_3$,CaO (5:9:1) | $CF_4$ | 0.2 | $O_2$ | 860 | 99.9 | 80 | no |

TABLE 7-continued

| | Decompositionally treating agent (Ratio of number of atoms) decompositionally treationg apparatus(FIG. 2 (A)) | Fluorocarbon | Concen-tration (%) | Coexisting gas | Decompositional treatment temperature (° C.) | Decompotsition rate (%) | Decompositional treatment performance | HF exhaust |
|---|---|---|---|---|---|---|---|---|
| Example 94 | $Al_2O_3$, $La_2O_3$,CaO (5:9:1) | $CF_4$ | 2.0 | $O_2$ | 860 | 99.9 | 83 | no |
| Example 95 | $Al_2O_3$, $La_2O_3$,CaO (5:9:1) | $C_2F_6$ | 1.0 | $O_2$ | 860 | 99.9 | 56 | no |
| Example 96 | $Al_2O_3$, $La_2O_3$,CaO (5:9:1) | $C_5F_8$ | 1.0 | $O_2$ | 860 | 99.9 | 43 | no |
| Example 97 | $Al_2O_3$, $La_2O_3$,CaO (5:9:1) | $CHF_3$ | 1.0 | $O_2$ | 860 | 99.9 | 107 | no |
| Example 98 | $Al_2O_3$, $La(OH)_3$, CaO (5:9:1) | $CF_4$ | 1.0 | $O_2$ | 860 | 99.9 | 80 | no |
| Example 99 | $Al_2O_3$, $La_2(CO_3)_3$, CaO (5:1:9) | $CF_4$ | 1.0 | $O_2$ | 860 | 99.9 | 79 | no |
| Example 100 | $Al_2O_3$, $La_2O_3$,CaO (5:9:1) | $CF_4$ | 1.0 | — | 860 | 99.9 | 82 | no |
| Example 101 | $Al_2O_3$, $La_2O_3$,CaO (5:18:2) | $CF_4$ | 1.0 | — | 860 | 99.9 | 42 | no |
| Example 102 | $Al_2O_3$, $La_2O_3$,CaO (10:9:1) | $CF_4$ | 1.0 | — | 860 | 99.9 | 39 | no |
| Example 103 | $Al_2O_3$, $La_2O_3$,CaO (5:9:1) | $CF_4$ | 0.2 | — | 860 | 99.9 | 79 | no |
| Example 104 | $Al_2O_3$, $La_2O_3$,CaO (5:9:1) | $CF_4$ | 2.0 | — | 860 | 99.9 | 80 | no |
| Example 105 | $Al_2O_3$, $La_2O_3$,CaO (5:9:1) | $C_2F_6$ | 1.0 | — | 860 | 99.9 | 54 | no |
| Example 106 | $Al_2O_3$, $La_2O_3$,CaO (5:9:1) | $C_5F_8$ | 1.0 | — | 860 | 99.9 | 40 | no |
| Example 107 | $Al_2O_3$, $La_2O_3$,CaO (5:9:1) | $CHF_3$ | 1.0 | — | 860 | 99.9 | 106 | no |
| Example 108 | $Al_2O_3$, $La(OH)_3$, CaO (5:9:1) | $CF_4$ | 1.0 | — | 860 | 99.9 | 80 | no |
| Example 109 | $Al_2O_3$, $La_2(CO_3)_3$, CaO (5:1:9) | $CF_4$ | 1.0 | — | 860 | 99.9 | 81 | no |

TABLE 8

| | Decompositionally treating agent (Ratio of number of atoms) decompositionally treationg apparatus(FIG. 2 (B)) | Fluorocarbon | Concen-tration (%) | Coexisting gas | Decompositional treatment temperature (° C.) | Decompotsition rate (%) | Decompositional treatment performance | HF exhaust |
|---|---|---|---|---|---|---|---|---|
| Example 110 | $Al_2O_3$, $La_2O_3$, CaO (5:9:1) | $CF_4$ | 1.0 | $O_2$, $H_2O$ | 860 | 99.9 | 112 | no |
| Example 111 | $Al_2O_3$, $La_2O_3$, CaO (5:18:2) | $CF_4$ | 1.0 | $O_2$, $H_2O$ | 860 | 99.9 | 55 | no |
| Example 112 | $Al_2O_3$, $La_2O_3$, CaO (10:9:1) | $CF_4$ | 1.0 | $O_2$, $H_2O$ | 860 | 99.9 | 50 | no |
| Example 113 | $Al_2O_3$, $La_2O_3$, CaO (5:9:1) | $CF_4$ | 0.2 | $O_2$, $H_2O$ | 860 | 99.9 | 108 | no |
| Example 114 | $Al_2O_3$, $La_2O_3$, CaO (5:9:1) | $CF_4$ | 2.0 | $O_2$, $H_2O$ | 860 | 99.9 | 111 | no |
| Example 115 | $Al_2O_3$, $La_2O_3$, CaO (5:9:1) | $C_2F_6$ | 1.0 | $O_2$, $H_2O$ | 860 | 99.9 | 73 | no |
| Example 116 | $Al_2O_3$, $La_2O_3$, CaO (5:9:1) | $C_5F_8$ | 1.0 | $O_2$, $H_2O$ | 860 | 99.9 | 56 | no |
| Example 117 | $Al_2O_3$, $La_2O_3$, CaO (5:9:1) | $CHF_3$ | 1.0 | $O_2$, $H_2O$ | 860 | 99.9 | 143 | no |
| Example 118 | $Al_2O_3$, $La(OH)_3$, CaO (5:9:1) | $CF_4$ | 1.0 | $O_2$, $H_2O$ | 860 | 99.9 | 107 | no |
| Example 119 | $Al_2O_3$, $La_2(CO_3)_3$, CaO (5:1:9) | $CF_4$ | 1.0 | $O_2$, $H_2O$ | 860 | 99.9 | 107 | no |
| Example 120 | $Al_2O_3$, $La_2O_3$, CaO (5:9:1) | $CF_4$ | 1.0 | $O_2$ | 860 | 99.9 | 79 | no |
| Example 121 | $Al_2O_3$, $La_2O_3$, CaO (5:18:2) | $CF_4$ | 1.0 | $O_2$ | 860 | 99.9 | 40 | no |
| Example 122 | $Al_2O_3$, $La_2O_3$, CaO (10:9:1) | $CF_4$ | 1.0 | $O_2$ | 860 | 99.9 | 37 | no |
| Example 123 | $Al_2O_3$, $La_2O_3$, CaO (5:9:1) | $CF_4$ | 0.2 | $O_2$ | 860 | 99.9 | 78 | no |
| Example 124 | $Al_2O_3$, $La_2O_3$, CaO (5:9:1) | $CF_4$ | 2.0 | $O_2$ | 860 | 99.9 | 76 | no |
| Example 125 | $Al_2O_3$, $La_2O_3$, CaO (5:9:1) | $C_2F_6$ | 1.0 | $O_2$ | 860 | 99.9 | 52 | no |
| Example 126 | $Al_2O_3$, $La_2O_3$, CaO (5:9:1) | $C_5F_8$ | 1.0 | $O_2$ | 860 | 99.9 | 40 | no |
| Example 127 | $Al_2O_3$, $La_2O_3$, CaO (5:9:1) | $CHF_3$ | 1.0 | $O_2$ | 860 | 99.9 | 101 | no |
| Example 128 | $Al_2O_3$, $La(OH)_3$, CaO (5:9:1) | $CF_4$ | 1.0 | $O_2$ | 860 | 99.9 | 78 | no |
| Example 129 | $Al_2O_3$, $La_2(CO_3)_3$, CaO (5:1:9) | $CF_4$ | 1.0 | $O_2$ | 860 | 99.9 | 77 | no |
| Example 130 | $Al_2O_3$, $La_2O_3$, CaO (5:9:1) | $CF_4$ | 1.0 | — | 860 | 99.9 | 77 | no |
| Example 131 | $Al_2O_3$, $La_2O_3$, CaO (5:18:2) | $CF_4$ | 1.0 | — | 860 | 99.9 | 38 | no |
| Example 132 | $Al_2O_3$, $La_2O_3$, CaO (10:9:1) | $CF_4$ | 1.0 | — | 860 | 99.9 | 36 | no |
| Example 133 | $Al_2O_3$, $La_2O_3$, CaO (5:9:1) | $CF_4$ | 0.2 | — | 860 | 99.9 | 78 | no |
| Example 134 | $Al_2O_3$, $La_2O_3$, CaO (5:9:1) | $CF_4$ | 2.0 | — | 860 | 99.9 | 79 | no |
| Example 135 | $Al_2O_3$, $La_2O_3$, CaO (5:9:1) | $C_2F_6$ | 1.0 | — | 860 | 99.9 | 50 | no |
| Example 136 | $Al_2O_3$, $La_2O_3$, CaO (5:9:1) | $C_5F_8$ | 1.0 | — | 860 | 99.9 | 37 | no |
| Example 137 | $Al_2O_3$, $La_2O_3$, CaO (5:9:1) | $CHF_3$ | 1.0 | — | 860 | 99.9 | 100 | no |
| Example 138 | $Al_2O_3$, $La_2O_3$, MgO (5:9:1) | $CF_4$ | 1.0 | — | 860 | 99.9 | 70 | no |
| Example 139 | $Al_2O_3$, $La_2O_3$, SrO (5:9:1) | $CF_4$ | 1.0 | — | 860 | 99.9 | 69 | no |

TABLE 9

| | Decompositionally treating agent (Ratio of number of atoms) decompositionally treationg apparatus(FIG. 2 (C)) | Fluorocarbon | Concen-tration (%) | Coexisting gas | Decompositional treatment temperature (° C.) | Decompotsition rate (%) | Decompositional treatment performance | HF exhaust |
|---|---|---|---|---|---|---|---|---|
| Example 140 | $Al_2O_3$, $La_2O_3$, CaO (5:9:1) | $CF_4$ | 1.0 | $O_2H_2O$ | 860 | 99.9 | 111 | no |
| Example 141 | $Al_2O_3$, $La_2O_3$, CaO (5:18:2) | $CF_4$ | 1.0 | $O_2H_2O$ | 860 | 99.9 | 55 | no |
| Example 142 | $Al_2O_3$, $La_2O_3$, CaO (10:9:1) | $CF_4$ | 1.0 | $O_2H_2O$ | 860 | 99.9 | 50 | no |
| Example 143 | $Al_2O_3$, $La_2O_3$, CaO (5:9:1) | $CF_4$ | 0.2 | $O_2H_2O$ | 860 | 99.9 | 108 | no |
| Example 144 | $Al_2O_3$, $La_2O_3$, CaO (5:9:1) | $CF_4$ | 2.0 | $O_2H_2O$ | 860 | 99.9 | 110 | no |
| Example 145 | $Al_2O_3$, $La_2O_3$, CaO (5:9:1) | $C_2F_6$ | 1.0 | $O_2H_2O$ | 860 | 99.9 | 73 | no |
| Example 146 | $Al_2O_3$, $La_2O_3$, CaO (5:9:1) | $C_5F_8$ | 1.0 | $O_2H_2O$ | 860 | 99.9 | 57 | no |

TABLE 9-continued

| | Decompositionally treating agent (Ratio of number of atoms) decompositionally treationg apparatus(FIG. 2 (C)) | Fluorocarbon | Concen-tration (%) | Coexisting gas | Decompositional treatment temperature (° C.) | Decompotsition rate (%) | Decompositional treatment performance | HF exhaust |
|---|---|---|---|---|---|---|---|---|
| Example 147 | $Al_2O_3$, $La_2O_3$, CaO (5:9:1) | $CHF_3$ | 1.0 | $O_2H_2O$ | 860 | 99.9 | 144 | no |
| Example 148 | $Al_2O_3$, $La(OH)_3$, CaO (5:9:1) | $CF_4$ | 1.0 | $O_2H_2O$ | 860 | 99.9 | 106 | no |
| Example 149 | $Al_2O_3$, $La_2(CO_3)_3$, CaO (5:1:9) | $CF_4$ | 1.0 | $O_2H_2O$ | 860 | 99.9 | 107 | no |
| Example 150 | $Al_2O_3$, $La_2O_3$, CaO (5:9:1) | $CF_4$ | 1.0 | $O_2$ | 860 | 99.9 | 76 | no |
| Example 151 | $Al_2O_3$, $La_2O_3$, CaO (5:18:2) | $CF_4$ | 1.0 | $O_2$ | 860 | 99.9 | 39 | no |
| Example 152 | $Al_2O_3$, $La_2O_3$, CaO (10:9:1) | $CF_4$ | 1.0 | $O_2$ | 860 | 99.9 | 37 | no |
| Example 153 | $Al_2O_3$, $La_2O_3$, CaO (5:9:1) | $CF_4$ | 0.2 | $O_2$ | 860 | 99.9 | 75 | no |
| Example 154 | $Al_2O_3$, $La_2O_3$, CaO (5:9:1) | $CF_4$ | 2.0 | $O_2$ | 860 | 99.9 | 78 | no |
| Example 155 | $Al_2O_3$, $La_2O_3$, CaO (5:9:1) | $C_2F_6$ | 1.0 | $O_2$ | 860 | 99.9 | 51 | no |
| Example 156 | $Al_2O_3$, $La_2O_3$, CaO (5:9:1) | $C_5F_8$ | 1.0 | $O_2$ | 860 | 99.9 | 39 | no |
| Example 157 | $Al_2O_3$, $La_2O_3$, CaO (5:9:1) | $CHF_3$ | 1.0 | $O_2$ | 860 | 99.9 | 100 | no |
| Example 158 | $Al_2O_3$, $La(OH)_3$, CaO (5:9:1) | $CF_4$ | 1.0 | $O_2$ | 860 | 99.9 | 74 | no |
| Example 159 | $Al_2O_3$, $La_2(CO_3)_3$, CaO (5:1:9) | $CF_4$ | 1.0 | $O_2$ | 860 | 99.9 | 73 | no |
| Example 160 | $Al_2O_3$, $La_2O_3$, CaO (5:9:1) | $CF_4$ | 1.0 | — | 860 | 99.9 | 76 | no |
| Example 161 | $Al_2O_3$, $La_2O_3$, CaO (5:18:2) | $CF_4$ | 1.0 | — | 860 | 99.9 | 37 | no |
| Example 162 | $Al_2O_3$, $La_2O_3$, CaO (10:9:1) | $CF_4$ | 1.0 | — | 860 | 99.9 | 35 | no |
| Example 163 | $Al_2O_3$, $La_2O_3$, CaO (5:9:1) | $CF_4$ | 0.2 | — | 860 | 99.9 | 72 | no |
| Example 164 | $Al_2O_3$, $La_2O_3$, CaO (5:9:1) | $CF_4$ | 2.0 | — | 860 | 99.9 | 73 | no |
| Example 165 | $Al_2O_3$, $La_2O_3$, CaO (5:9:1) | $C_2F_6$ | 1.0 | — | 860 | 99.9 | 49 | no |
| Example 166 | $Al_2O_3$, $La_2O_3$, CaO (5:9:1) | $C_5F_8$ | 1.0 | — | 860 | 99.9 | 39 | no |
| Example 167 | $Al_2O_3$, $La_2O_3$, CaO (5:9:1) | $CHF_3$ | 1.0 | — | 860 | 99.9 | 98 | no |
| Example 168 | $Al_2O_3$, $La_2O_3$, $Ca(OH)_2$ (5:9:1) | $CF_4$ | 1.0 | — | 860 | 99.9 | 72 | no |
| Example 169 | $Al_2O_3$, $La_2O_3$, $Mg(OH)_2$ (5:9:1) | $CF_4$ | 1.0 | — | 860 | 99.9 | 67 | no |

TABLE 10

| | Decompositionally treating agent (Ratio of number of atoms) decompositionally treationg apparatus(FIG. 4 (A)) | Fluorocarbon | Concen-tration (%) | Coexisting gas | Decompositional treatment temperature (° C.) | Decompotsition rate (%) | Decompositional treatment performance | HF exhaust |
|---|---|---|---|---|---|---|---|---|
| Example 170 | $Al_2O_3$, $La_2O_3$, CaO (5:9:1) | $CF_4$ | 1.0 | $O_2$, $H_2O$ | 860 | 99.9 | 107 | no |
| Example 171 | $Al_2O_3$, $La_2O_3$, CaO (5:18:2) | $CF_4$ | 1.0 | $O_2$, $H_2O$ | 860 | 99.9 | 55 | no |
| Example 172 | $Al_2O_3$, $La_2O_3$, CaO (10:9:1) | $CF_4$ | 1.0 | $O_2$, $H_2O$ | 860 | 99.9 | 50 | no |
| Example 173 | $Al_2O_3$, $La_2O_3$, CaO (5:9:1) | $CF_4$ | 0.2 | $O_2$, $H_2O$ | 860 | 99.9 | 104 | no |
| Example 174 | $Al_2O_3$, $La_2O_3$, CaO (5:9:1) | $CF_4$ | 2.0 | $O_2$, $H_2O$ | 860 | 99.9 | 109 | no |
| Example 175 | $Al_2O_3$, $La_2O_3$, CaO (5:9:1) | $C_2F_6$ | 1.0 | $O_2$, $H_2O$ | 860 | 99.9 | 72 | no |
| Example 176 | $Al_2O_3$, $La_2O_3$, CaO (5:9:1) | $C_5F_8$ | 1.0 | $O_2$, $H_2O$ | 860 | 99.9 | 52 | no |
| Example 177 | $Al_2O_3$, $La_2O_3$, CaO (5:9:1) | $CHF_3$ | 1.0 | $O_2$, $H_2O$ | 860 | 99.9 | 137 | no |
| Example 178 | $Al_2O_3$, $La(OH)_3$, CaO (5:9:1) | $CF_4$ | 1.0 | $O_2$, $H_2O$ | 860 | 99.9 | 106 | no |
| Example 179 | $Al_2O_3$, $La_2(CO_3)_3$, CaO (5:1:9) | $CF_4$ | 1.0 | $O_2$, $H_2O$ | 860 | 99.9 | 103 | no |

TABLE 11

| | Decompositionally treating agent (Ratio of number of atoms) decompositionally treationg apparatus(FIG. 4 (B)) | Fluorocarbon | Concen-tration (%) | Coexisting gas | Decompositional treatment temperature (° C.) | Decompotsition rate (%) | Decompositional treatment performance | HF exhaust |
|---|---|---|---|---|---|---|---|---|
| Example 180 | $Al_2O_3$, $La_2O_3$, CaO (5:9:1) | $CF_4$ | 1.0 | O2, $H_2O$ | 860 | 99.9 | 106 | no |
| Example 181 | $Al_2O_3$, $La_2O_3$, CaO (5:18:2) | $CF_4$ | 1.0 | $H_2O$ | 860 | 99.9 | 54 | no |
| Example 182 | $Al_2O_3$, $La_2O_3$, CaO (10:9:1) | $CF_4$ | 1.0 | $H_2O$ | 860 | 99.9 | 49 | no |
| Example 183 | $Al_2O_3$, $La_2O_3$, CaO (5:9:1) | $CF_4$ | 0.2 | $H_2O$ | 860 | 99.9 | 105 | no |
| Example 184 | $Al_2O_3$, $La_2O_3$, CaO (5:9:1) | $CF_4$ | 2.0 | $H_2O$ | 860 | 99.9 | 108 | no |
| Example 185 | $Al_2O_3$, $La_2O_3$, CaO (5:9:1) | $C_2F_6$ | 1.0 | $H_2O$ | 860 | 99.9 | 72 | no |
| Example 186 | $Al_2O_3$, $La_2O_3$, CaO (5:9:1) | $C_5F_8$ | 1.0 | $H_2O$ | 860 | 99.9 | 53 | no |
| Example 187 | $Al_2O_3$, $La_2O_3$, CaO (5:9:1) | $CHF_3$ | 1.0 | $H_2O$ | 860 | 99.9 | 136 | no |
| Example 188 | $Al_2O_3$, $La(OH)_3$, CaO (5:9:1) | $CF_4$ | 1.0 | $H_2O$ | 860 | 99.9 | 105 | no |
| Example 189 | $Al_2O_3$, $La_2(CO_3)_3$, CaO (5:1:9) | $CF_4$ | 1.0 | $H_2O$ | 860 | 99.9 | 104 | no |

TABLE 12

Figure 5:
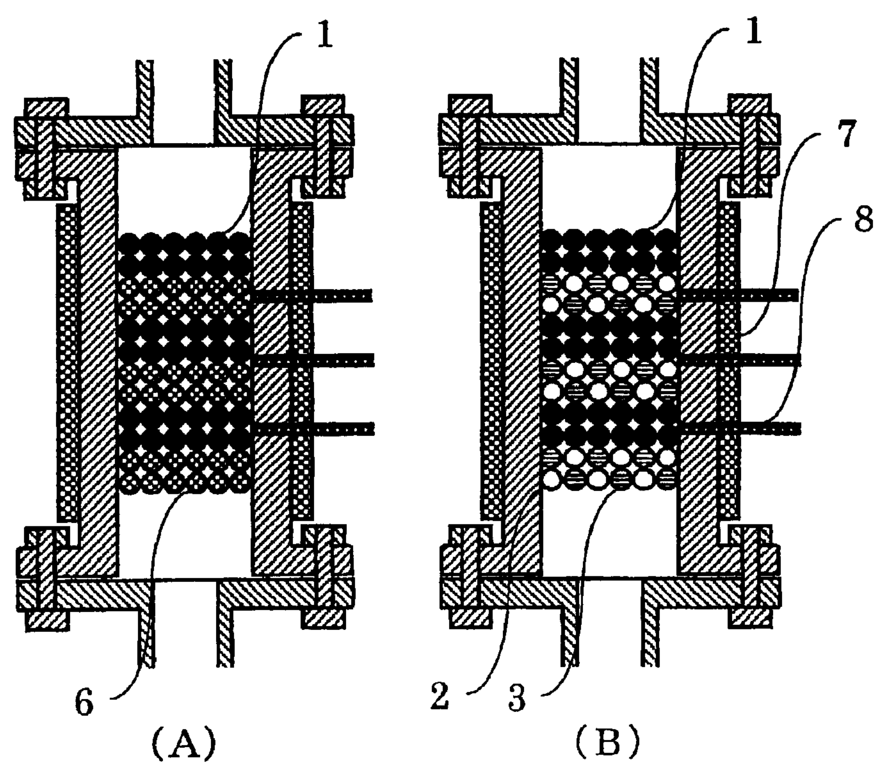
FIG. 5 is a cross sectional view showing an example of decompositionally treating apparatus for the implementation of the decompositionally treating method for fluorocarbons (fifth embodiment) according to the present invention.

| | Decompositionally treating agent (Ratio of number of atoms) decompositionally treationg apparatus(FIG. 5 (A)) | Fluorocarbon | Concen-tration (%) | Coexisting gas | Decompositional treatment temperature (° C.) | Decompotsition rate (%) | Decompositional treatment performance | HF exhaust |
|---|---|---|---|---|---|---|---|---|
| Example 190 | $Al_2O_3$, $La_2O_3$, CaO (5:9:1) | $CF_4$ | 1.0 | $O_2$, $H_2O$ | 860 | 99.9 | 105 | no |
| Example 191 | $Al_2O_3$, $La_2O_3$, CaO (5:18:2) | $CF_4$ | 1.0 | $O_2$, $H_2O$ | 860 | 99.9 | 54 | no |
| Example 192 | $Al_2O_3$, $La_2O_3$, CaO (10:9:1) | $CF_4$ | 1.0 | $O_2$, $H_2O$ | 860 | 99.9 | 50 | no |
| Example 193 | $Al_2O_3$, $La_2O_3$, CaO (5:9:1) | $CF_4$ | 0.2 | $O_2$, $H_2O$ | 860 | 99.9 | 104 | no |
| Example 194 | $Al_2O_3$, $La_2O_3$, CaO (5:9:1) | $CF_4$ | 2.0 | $O_2$, $H_2O$ | 860 | 99.9 | 109 | no |
| Example 195 | $Al_2O_3$, $La_2O_3$, CaO (5:9:1) | $C_2F_6$ | 1.0 | $O_2$, $H_2O$ | 860 | 99.9 | 72 | no |
| Example 196 | $Al_2O_3$, $La_2O_3$, CaO (5:9:1) | $C_5F_8$ | 1.0 | $O_2$, $H_2O$ | 860 | 99.9 | 53 | no |
| Example 197 | $Al_2O_3$, $La_2O_3$, CaO (5:9:1) | $CHF_3$ | 1.0 | $O_2$, $H_2O$ | 860 | 99.9 | 135 | no |
| Example 198 | $Al_2O_3$, $La(OH)_3$, CaO (5:9:1) | $CF_4$ | 1.0 | $O_2$, $H_2O$ | 860 | 99.9 | 106 | no |
| Example 199 | $Al_2O_3$, $La_2(CO_3)_3$, CaO (5:1:9) | $CF_4$ | 1.0 | $O_2$, $H_2O$ | 860 | 99.9 | 104 | no |

TABLE 13

| | Decompositionally treating agent (Ratio of number of atoms) decompositionally treationg apparatus(FIG. 5 (B)) | Fluorocarbon | Concen-tration (%) | Coexisting gas | Decompositional treatment temperature (° C.) | Decompotsition rate (%) | Decompositional treatment performance | HF exhaust |
|---|---|---|---|---|---|---|---|---|
| Example 200 | $Al_2O_3$, $La_2O_3$, CaO (5:9:1) | $CF_4$ | 1.0 | $H_2O$ | 860 | 99.9 | 106 | no |
| Example 201 | $Al_2O_3$, $La_2O_3$, CaO (5:18:2) | $CF_4$ | 1.0 | $H_2O$ | 860 | 99.9 | 53 | no |
| Example 202 | $Al_2O_3$, $La_2O_3$, CaO (10:9:1) | $CF_4$ | 1.0 | $H_2O$ | 860 | 99.9 | 51 | no |
| Example 203 | $Al_2O_3$, $La_2O_3$, CaO (5:9:1) | $CF_4$ | 0.2 | $H_2O$ | 860 | 99.9 | 103 | no |
| Example 204 | $Al_2O_3$, $La_2O_3$, CaO (5:9:1) | $CF_4$ | 2.0 | $H_2O$ | 860 | 99.9 | 107 | no |
| Example 205 | $Al_2O_3$, $La_2O_3$, CaO (5:9:1) | $C_2F_6$ | 1.0 | $H_2O$ | 860 | 99.9 | 69 | no |
| Example 206 | $Al_2O_3$, $La_2O_3$, CaO (5:9:1) | $C_5F_8$ | 1.0 | $H_2O$ | 860 | 99.9 | 56 | no |
| Example 207 | $Al_2O_3$, $La_2O_3$, CaO (5:9:1) | $CHF_3$ | 1.0 | $H_2O$ | 860 | 99.9 | 134 | no |
| Example 208 | Al2O3, $La(OH)_3$, CaO (5:9:1) | $CF_4$ | 1.0 | $H_2O$ | 860 | 99.9 | 106 | no |
| Example 209 | Al2O3, $La_2(CO_3)_3$, CaO (5:1:9) | $CF_4$ | 1.0 | $H_2O$ | 860 | 99.9 | 103 | no |

TABLE 14

| | Decompositionally treating agent (Ratio of number of atoms) decompositionally treationg apparatus(FIG. 2 (A)) | Fluorocarbon | Concen-tration (%) | Coexisting gas | Decompositional treatment temperature (° C.) | Decompotsition rate (%) | Decompositional treatment performance | HF exhaust |
|---|---|---|---|---|---|---|---|---|
| Example 210 | $Al_2O_3$, $La_2O_3$, CaO (5:7:3) | $CF_4$ | 1.0 | $O_2$, $H_2O$ | 860 | 99.9 | 107 | no |
| Example 211 | $Al_2O_3$, $La_2O_3$, CaO (5:5:5) | $CF_4$ | 1.0 | $O_2$, $H_2O$ | 860 | 99.9 | 98 | no |
| Example 212 | $Al_2O_3$, $La_2O_3$, CaO (5:3:7) | $CF_4$ | 1.0 | $O_2$, $H_2O$ | 860 | 99.9 | 90 | no |
| Example 213 | $Al_2O_3$, $La_2O_3$, CaO (5:1:9) | $CF_4$ | 0.2 | $O_2$, $H_2O$ | 860 | 99.9 | 81 | no |

TABLE 15

| | Decompositionally treating agent (Ratio of number of atoms) decompositionally treationg apparatus(FIG. 2 (B)) | Fluorocarbon | Concen-tration (%) | Coexisting gas | Decompositional treatment temperature (° C.) | Decompotsition rate (%) | Decompositional treatment performance | HF exhaust |
|---|---|---|---|---|---|---|---|---|
| Example 214 | $Al_2O_3$, $La_2O_3$, CaO (5:7:3) | $CF_4$ | 1.0 | $O_2$, $H_2O$ | 860 | 99.9 | 105 | no |
| Example 215 | $Al_2O_3$, $La_2O_3$, CaO (5:5:5) | $CF_4$ | 1.0 | $O_2$, $H_2O$ | 860 | 99.9 | 97 | no |
| Example 216 | $Al_2O_3$, $La_2O_3$, CaO (5:3:7) | $CF_4$ | 1.0 | $O_2$, $H_2O$ | 860 | 99.9 | 88 | no |
| Example 217 | $Al_2O_3$, $La_2O_3$, CaO (5:1:9) | $CF_4$ | 0.2 | $O_2$, $H_2O$ | 860 | 99.9 | 79 | no |

TABLE 16

| | Decompositionally treating agent (Ratio of number of atoms) decompositionally treationg apparatus(FIG. 2 (C)) | Fluorocarbon | Concen-tration (%) | Coexisting gas | Decompositional treatment temperature (° C.) | Decompotsition rate (%) | Decompositional treatment performance | HF exhaust |
|---|---|---|---|---|---|---|---|---|
| Example 218 | $Al_2O_3$, $La_2O_3$, CaO (5:7:3) | $CF_4$ | 1.0 | $O_2$, $H_2O$ | 860 | 99.9 | 108 | no |
| Example 219 | $Al_2O_3$, $La_2O_3$, CaO (5:5:5) | $CF_4$ | 1.0 | $O_2$, $H_2O$ | 860 | 99.9 | 99 | no |
| Example 220 | $Al_2O_3$, $La_2O_3$, CaO (5:3:7) | $CF_4$ | 1.0 | $O_2$, $H_2O$ | 860 | 99.9 | 85 | no |
| Example 221 | $Al_2O_3$, $La_2O_3$, CaO (5:1:9) | $CF_4$ | 0.2 | $O_2$, $H_2O$ | 860 | 99.9 | 77 | no |

TABLE 17

| | Decompositionally treating agent | Fluorocarbon | Concentration (%) | Coexisting gas | Decompositional treatment temperature (° C.) | Decompotsition rate (%) | Decompositional treatment performance | HF exhaust |
|---|---|---|---|---|---|---|---|---|
| Comparative Example 1 | $Al_2O_3$ | $CF_4$ | 1.0 | $O_2$ | 860 | 99.9 | 8 | no |
| Comparative Example 2 | $Al_2O_3$ | $CF_4$ | 1.0 | $O_2$, $H_2O$ | 860 | 99.9 | 78 | yes |

What is claimed is:

1. A decompositionally treating method for fluorocarbons which comprises decomposing a fluorocarbon by bringing a fluorocarbon-containing gas into contact, under heating in the coexistence of oxygen and/or steam, with a decompositionally treating agent which comprises aluminum oxide and thereafter bringing the gas into contact with a decompositionally treating agent which comprises a lanthanoid oxide.

2. The decompositionally treating method for fluorocarbons according to claim 1, wherein the temperature of contact between the fluorocarbon-containing gas and the decompositionally treating agent is in the range of 300 to 1000° C.

3. The decompositionally treating method for fluorocarbons according to claim 1, wherein the fluorocarbon-containing gas before a decompositional treatment is subjected to heat exchange with a gas after a decompositional treatment.

4. The decompositionally treating method for fluorocarbons according to claim 1, wherein the fluorocarbon is a perfluorocarbon.

5. The decompositionally treating method for fluorocarbons according to claim 1, wherein the fluorocarbon is $CF_4$.

6. A decompositionally treating method for fluorocarbons which comprises decomposing a fluorocarbon by bringing a fluorocarbon-containing gas into contact, under heating in the coexistence of oxygen and/or steam, with a decompositionally treating agent which comprises aluminum oxide and thereafter bringing the gas into contact with a decompositionally treating agent which comprises a lanthanoid oxide and a decompositionally treating agent which comprises an alkaline earth metal oxide.

7. The decompositionally treating method for fluorocarbons according to claim 6, wherein the temperature of contact between the fluorocarbon-containing gas and the decompositionally treating agent is in the range of 300 to 1000° C.

8. The decompositionally treating method for fluorocarbons according to claim 6, wherein the fluorocarbon-containing gas before a decompositional treatment is subjected to heat exchange with a gas after a decompositional treatment.

9. The decompositionally treating method for fluorocarbons according to claim 6, wherein the fluorocarbon is a perfluorocarbon.

10. The decompositionally treating method for fluorocarbons according to claim 6, wherein the fluorocarbon is $CF_4$.

11. A decompositionally treating method for fluorocarbons which comprises decomposing a fluorocarbon by bringing a fluorocarbon-containing gas into contact, under heating in the coexistence of oxygen and/or steam, with a decompositionally treating agent which comprises aluminum oxide and thereafter bringing the gas into contact with a decompositionally treating agent which comprises a lanthanoid oxide and an alkaline earth metal oxide.

12. The decompositionally treating method for fluorocarbons according to claim 11, wherein the temperature of contact between the fluorocarbon-containing gas and the decompositionally treating agent is in the range of 300 to 1000° C.

13. The decompositionally treating method for fluorocarbons according to claim 11, wherein the fluorocarbon-containing gas before a decompositional treatment is subjected to heat exchange with a gas after a decompositional treatment.

14. The decompositionally treating method for fluorocarbons according to claim 11, wherein the fluorocarbon is a perfluorocarbon.

15. The decompositionally treating method for fluorocarbons according to claim 11, wherein the fluorocarbon is $CF_4$.

16. A decompositionally treating method for fluorocarbons which comprises decomposing a fluorocarbon by bringing a fluorocarbon-containing gas into contact under heating with a decompositionally treating agent which comprises ingredients aluminum oxide or aluminum hydroxide and at least one species selected from the group consisting of oxides, hydroxides, and carbonates each of lanthanum, wherein the ratio of the number of aluminum atoms contained in the agent to the total number of lanthanoid atoms contained therein is 1:0.1 to 10, and wherein the ingredients are contained in an amount of at least 70% by weight based on said agent, and without exhausting hydrogen fluoride from the decomposition apparatus in which the decomposing takes place.

17. The decompositionally treating method for fluorocarbons according to claim 16, which comprises decomposing a fluorocarbon by bringing a fluorocarbon-containing gas into contact under heating with a decompositionally treating agent in the coexistence of oxygen and/or steam.

18. The decompositionally treating method for fluorocarbons according to claim 16, wherein the temperature of contact between the fluorocarbon-containing gas and the decompositionally treating agent is in the range of 300 to 1000° C.

19. decompositionally treating method for fluorocarbons according to claim 16, wherein the decompositionally treating agent is consecutively discharged out of a reaction system, while fresh decompositionally treating agent is supplied to the reaction system.

20. The decompositionally treating method for fluorocarbons according to claim 16, wherein the fluorocarbon-containing gas before a decompositional treatment is subjected to heat exchange with a gas after a decompositional treatment.

21. The decompositionally treating method for fluorocarbons according to claim 16, wherein the fluorocarbon is a perfluorocarbon.

22. The decompositionally treating method for fluorocarbons according to claim 16, wherein the fluorocarbon is a $CF_4$.

23. A decompositionally treating method for fluorocarbons which comprises decomposing a fluorocarbon by bringing a fluorocarbon-containing gas into contact under heating with a decompositionally treating agent which comprises ingredients aluminum oxide or aluminum hydroxide, at least one species selected from the group consisting of oxides, hydroxides, and carbonates each of lanthanum, and oxides, hydroxides, and carbonates each of an alkaline earth metal, wherein the ratio of the number of aluminum atoms contained in the agent to the total number of lanthanoid atoms contained therein and the alkaline earth metal atoms contained therein is 1:0.1 to 10, and wherein the ingredients are contained in an amount of at least 70% by weight based on said agent, and without exhausting hydrogen fluoride from the decomposition apparatus in which the decomposing takes place.

24. The decompositionally treating method for fluorocarbons according to claim 23, which comprises decomposing a fluorocarbon by bringing a fluorocarbon-containing gas into contact under heating with a decompositionally treating agent in the coexistence of oxygen and/or steam.

25. The decompositionally treating method for fluorocarbons according to claim 23, wherein the temperature of contact between the fluorocarbon-containing gas and the decompositionally treating agent is in the range of 300 to 1000° C.

26. The decompositionally treating method for fluorocarbons according to claim 23, wherein the decompositionally treating agent is consecutively discharged out of a reaction system, while fresh decompositionally treating agent is supplied to the reaction system.

27. The decompositionally treating method for fluorocarbons according to claim 23, wherein the fluorocarbon-containing gas before a decompositional treatment is subjected to heat exchange with a gas after a decompositional treatment.

28. The decompositionally treating method for fluorocarbons according to claim 23, wherein the fluorocarbon is a perfluorocarbon.

29. The decompositionally treating method for fluorocarbons according to claim 23, wherein the fluorocarbon is $CF_4$.

* * * * *